(12) United States Patent
Toyoda et al.

(10) Patent No.: US 8,982,242 B2
(45) Date of Patent: Mar. 17, 2015

(54) IMAGING DEVICE AND IMAGING METHOD

(75) Inventors: Tetsuya Toyoda, Hachioji (JP); Kosuke Matsubara, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 292 days.

(21) Appl. No.: 13/495,251

(22) Filed: Jun. 13, 2012

(65) Prior Publication Data

US 2012/0320236 A1 Dec. 20, 2012

(30) Foreign Application Priority Data

Jun. 15, 2011 (JP) ................. P2011-132873

(51) Int. Cl.
*H04N 5/76* (2006.01)
*H04N 5/228* (2006.01)
*H04N 5/335* (2011.01)
*H04N 5/232* (2006.01)

(52) U.S. Cl.
CPC ................. *H04N 5/23277* (2013.01)
USPC ............ 348/231.99; 348/222.1; 348/295

(58) Field of Classification Search
CPC ........... H04N 5/2355; H04N 5/35581; H04N 5/23209; H04N 5/23212; H04N 5/2352; H04N 5/2353
USPC ............................... 348/223.1, 274
See application file for complete search history.

(56) References Cited

U.S. PATENT DOCUMENTS 7,209,601 B2 * 4/2007 Manabe ............... 382/294
7,844,134 B2 * 11/2010 Sasaki et al. ........... 382/295
2008/0204592 A1 * 8/2008 Jia et al. ................ 348/402.1
2010/0026839 A1 * 2/2010 Border et al. ........... 348/231.2
2012/0268617 A1 10/2012 Ishikawa

FOREIGN PATENT DOCUMENTS

| JP | 2003-259184 | 9/2003 |
|----|-------------|--------|
| JP | 2006-033123 | 2/2006 |
| JP | 2009-077272 | 4/2009 |

OTHER PUBLICATIONS

Notice of Rejection from corresponding Chinese Patent Application Serial No. 201210199721.0, mailed Jun. 23, 2014 (8 pgs.).
Office Action from corresponding Japanese Patent Application Serial No. 2011-132873, mailed Jan. 16, 2015 (4 pgs.).

* cited by examiner

*Primary Examiner* — Twyler Haskins
*Assistant Examiner* — Padma Haliyur
(74) *Attorney, Agent, or Firm* — John C. Pokotylo; Straub & Pokotylo

(57) ABSTRACT

An imaging device of the present invention, for taking and storing movies and still pictures, comprises an image sensor, an imaging processing section, and a control section for controlling exposure of the image sensor and controlling taking of an optical image, wherein the control section, when taking still pictures while shooting a movie, carries out exposure by dividing a time corresponding to a single frame of the movie into a plurality of times, applies processing by the imaging processing section to acquire a plurality of image data, performs positional alignment of the subject image of the plurality of image data and combines a plurality of image data, and stores as still picture data, and combines a plurality of image data without carrying out positional alignment of the subject image of the priority of image data and stores as a single frame of the movie data.

15 Claims, 18 Drawing Sheets

US 8,982,242 B2

IMAGING DEVICE AND IMAGING METHOD

Benefit is claimed, under 35 U.S.C. §119, to the filing date of prior Japanese Patent Application No. 2011-132873 filed on Jun. 15, 2011. This application is expressly incorporated herein by reference. The scope of the present invention is not limited to any requirements of the specific embodiments described in the application.

BACKGROUND OF THE INVENTION

1. Field of the Invention

The present invention relates to an imaging device having a function to shoot still pictures while shooting a movie.

2. Description of the Related Art

In recent years imaging devices having a function to shoot still pictures while shooting a movie have been proposed. An imaging device that reduces picture blur within a frame during movie shooting has also been proposed. For example, Japanese patent laid-open number 2009-77272 (laid-open Apr. 9, 2009, hereinafter "patent publication") discloses an imaging device that forms an image at both a normal exposure within a movie frame and at an exposure time that is shorter than this normal exposure, and makes into a movie by adopting either one in accordance with an amount of picture blur within a frame rate.

The patent publication is an example of a touch panel used in a digital camera. In this related art, there is provided a digital camera in which, in a playback state where a grip section of the camera is not being held, an image is displayed on the entire screen of a rear display section having a touch panel, while in a shooting state where the grip section is being held a key icon is displayed at a bottom part of the screen.

SUMMARY OF THE INVENTION

The present invention has as its object to provide an imaging device capable of improving smoothness of a stored movie and reducing picture blur of still pictures.

An imaging device of the present invention for taking and storing movies and still pictures, comprises an image sensor for photoelectrically converting an incident optical image, an imaging processing section for processing output signals of the image sensor to acquire image data, and a control section for controlling exposure of the image sensor and controlling taking of the optical image, wherein the control section, when taking still pictures while shooting a movie, carries out exposure by dividing a time corresponding to a single frame of the movie into a plurality of times, applies processing by the imaging processing section to acquire a plurality of image data, performs positional alignment of the subject image of the plurality of image data and combines a plurality of image data and stores as still picture data, and combines a plurality of image data without carrying out positional alignment of the subject image of the plurality of image data and stores as a single frame of the movie data.

An imaging device of the present invention for taking and storing movies and still pictures, comprises an image sensor for photoelectrically converting an incident optical image, an imaging processing section for processing output signals of the image sensor to acquire image data, and a control section for controlling exposure of the image sensor and controlling taking of the optical image, wherein the control section, when taking still pictures while shooting a movie, carries out exposure by dividing a time corresponding to a single frame of a movie, with respect to a plurality of frames of a movie, into a longer time and a shorter time, applies processing by the imaging processing section to acquire a plurality of image data, performs positional alignment of a subject image to combine image data corresponding to the shorter time exposure, with respect to the plurality of frames, and stores as still picture data, and stores image data corresponding to the longer time exposure, with respect to the plurality of frames, as respective single frames of the plurality of frames of the movie.

An imaging method of the present invention, for processing output signals of an image sensor for photoelectrically converting an incident optical image to acquire image data, and forming and storing movies and still pictures, comprises, when taking still pictures while shooting a movie, carrying out exposure by dividing a time corresponding to a single frame of the movie into a plurality of times, carrying out imaging processing to acquire a plurality of image data, performing positional alignment of a subject image of the plurality of image data and combining a plurality of image data, and storing as still picture data, and combining a plurality of image data without carrying out positional alignment of the subject image of the priority of image data and storing as a single frame of movie data.

An imaging method of the present invention, for processing output signals of an image sensor for photoelectrically converting an incident optical image to acquire image data, and forming and storing movies and still pictures, comprises, when taking still pictures while shooting a movie, carrying out exposure by dividing a time corresponding to a single frame of a movie, with respect to a plurality of frames of a movie, into a longer time and a shorter time, carrying out imaging processing to acquire a plurality of image data, performing positional alignment of a subject image to combine image data corresponding to the shorter time exposure, with respect to the plurality of frames, and storing as still picture data, and storing image data corresponding to the longer time exposure, with respect to the plurality of frames, as respective single frames of the plurality of frames of the movie.

DETAILED DESCRIPTION OF THE PREFERRED EMBODIMENT

Preferred embodiments using a camera to which the present invention has been applied will be described in the following in accordance with the drawings. A camera of one preferred embodiment of the present invention is a digital camera, and has an imaging section, with a subject image being converted to image data by this imaging section, and the subject image then being subjected to live view display on a display section (rear surface liquid crystal monitor and EVF) arranged on a rear surface, based on this converted image data. A photographer determines composition and photo opportunity by looking at the live view display. At the time of a release operation image data of a still picture is stored in a storage medium, and if a movie button is operated image data of a movie is stored in the storage medium. If a release operation is carried out during storing of a movie, image data of a still picture is also stored in the storage medium, together with image data of a movie. Also, image data that has been stored in the storage medium can be played back and displayed on the display section if playback mode is selected.

Figure 1:
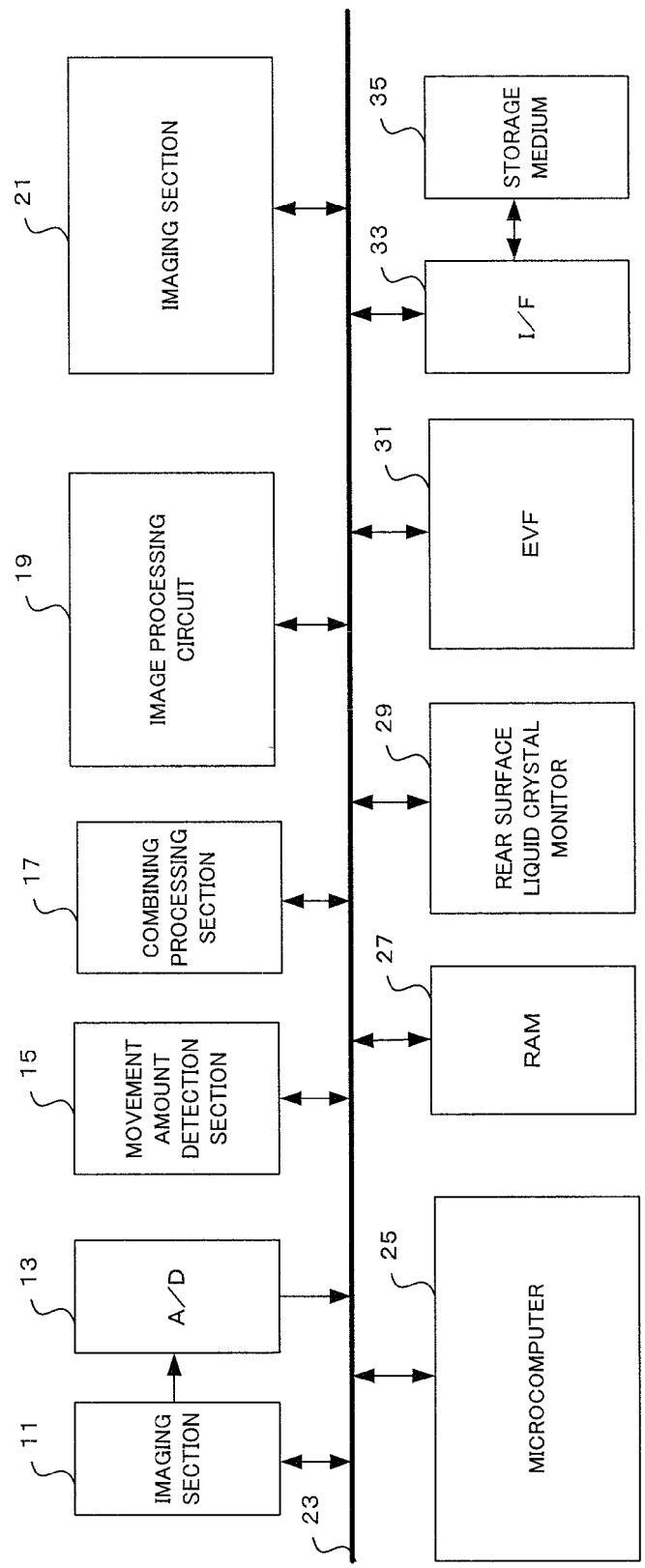
FIG. 1 is a block diagram mainly showing the electrical structure of a camera of one embodiment of the present invention.

FIG. 1 is a block diagram mainly showing the electrical structure of a camera of one embodiment of the present invention. An imaging section 11, A/D (analog to digital converter) 13, movement amount detection circuit 15, combining processing circuit 17, image processing circuit 19, operation section 21, microcomputer 25, RAM (Random Access Memory) 27, rear surface liquid crystal monitor 29, EVF (electronic View Finder) 31 and I/F (interface) 33 are connected to a bus 23, capable of input and output.

The bus 23 is a transfer path for transferring various data, that has been read out or generated inside a camera body, and control signals to respective circuits within the camera body.

The imaging section 11 includes a photographing lens, exposure control elements such as an aperture, shutter etc., an image sensor, and imaging control circuits etc., and converts a subject image formed by the photographing lens into image signals, and outputs the image signals as image data to the A/D 13. The image sensor is an element for photoelectrically converting an optical image that is incident via the photographing lens, and has photodiodes that constitute each pixel arranged two-dimensionally in a matrix shape, with each photodiode generating photoelectric conversion current in accordance with received light amount, and this photoelectric conversion current is the subject of charge storage by a capacitor connected to each photodiode. A Bayer array RGB filter is arranged on the front surface of each pixel.

The imaging section 11 functions as an imaging processing section for processing output signals of the image sensor to obtain image data, and carries out exposure by dividing a time corresponding to a single frame of a movie into a plurality of time periods in accordance with control signals from the microcomputer 25 to generate a plurality of image data. The image sensor is not limited to a Bayer array, and can also be of a type such as Foveon, for example.

The A/D 13 is an analog to digital converter for converting analog signals to digital signals, and converts image signals input from the imaging section 11 into image data, and outputs the image data to the bus 23. Image data that has been output to the bus 23 is temporarily stored in RAM 27, which will be described later. In this specification, there may be situations where image signals generated in the imaging section 11 are also referred to as image data. Also, when image signals that have been output from the Bayer array image sensor are converted directly to image data, this will be further referred to as RAW data, and also referred to as Bayer data.

Figure 3:
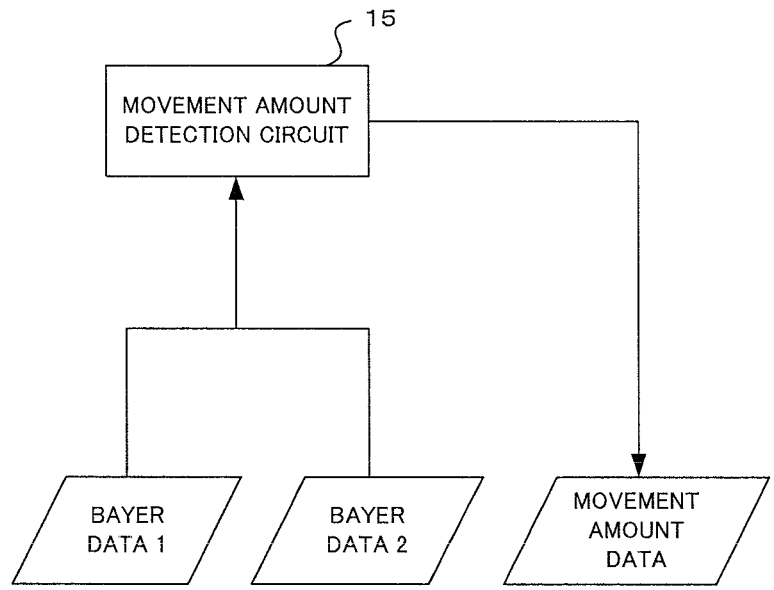
FIG. 3 is a block diagram showing a relationship for input and output data of a movement amount detection circuit of a camera of one embodiment of the present invention.

As shown in FIG. 3, the movement amount detection circuit 15 is input with Bayer data 1 and Bayer data 2 via the bus 23 (in FIG. 3 the bus 23 is omitted), a movement amount is calculated by comparing the two Bayer data, and the calculated movement amount data is output to the bus 23. As described previously, each time image data for a single frame portion is output to the bus 23, it is temporarily stored in RAM 27. The movement amount detection circuit 15 reads out image data for two frames that has been temporarily stored in the RAM 27, and calculates a movement amount of the subject image by comparing these data. This movement amount detection circuit 15 functions as a hand-shake amount detection section for detecting amounts of hand-shake. As the movement amount detection circuit 15, besides comparison of image data over two frames as shown in FIG. 3, it is also possible, for example, to provide a sensor for detecting movement of the camera body, such as a gyro or 6 axis sensor, so as to detect movement amount.

Figure 4:
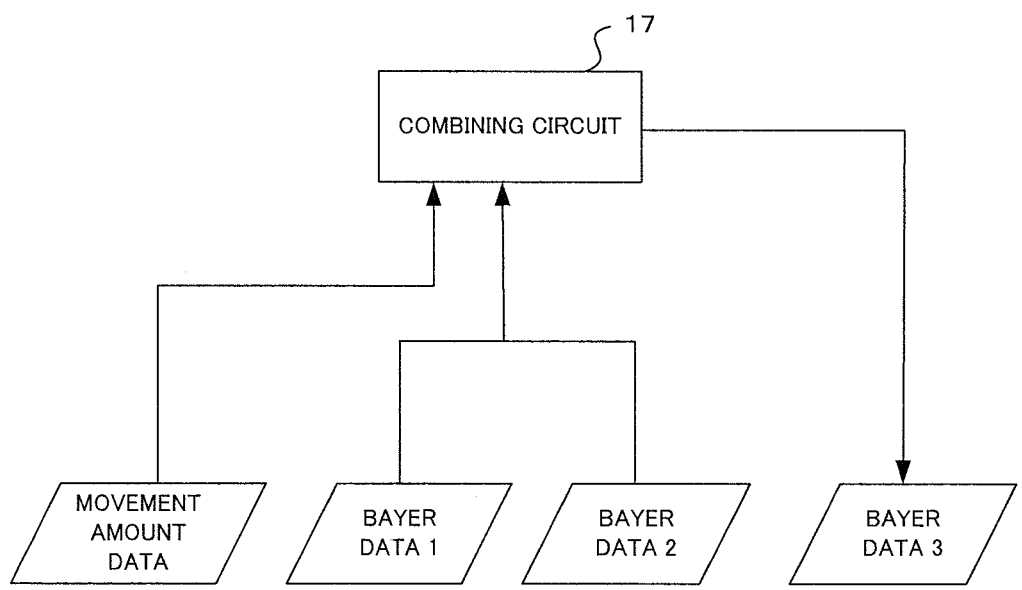
FIG. 4 is a block diagram showing a relationship for input and output data of a combination processing circuit of a camera of one embodiment of the present invention.

As shown in FIG. 4, the combining processing circuit 17 is input with Bayer data 1 and Bayer data 2 via the bus 23 (in FIG. 4 the bus 23 is omitted), a composite image is generated based on the two Bayer data, and Bayer data 3 of this composite image is output to the bus 23. When generating the composite image, in a case where images of the Bayer data 1 and Bayer data 2 are simply combined by superimposing, combination is such that movement amount data is input via the bus 23, and after an image is moved by an amount corresponding to this movement amount there is positional alignment to combine images of the Bayer data 1 and the Bayer data 2.

The image processing circuit 19 is input with Bayer data from the bus 23, image processing is applied, and image data that has been subjected to this image processing is output to the bus 23. As image processing, noise reduction processing (NR), white balance correction (WB), demosaicing processing, color conversion, tone conversion (gamma conversion), edge enhancement, and YC conversion are carried out. Compression processing of image data that has been YC converted, and expansion processing of image data that has been compressed, are also carried out. Details of this image processing will be described later using FIG. 2.

The operation section 21 includes various operation members provided in the camera, with operating states of the various operation members being detected and detection signals transmitted to the microcomputer 25 via the bus 23. As the various operation members there are a power supply button, a release button, a movie button, a camera mode selection dial, a menu button, a cross-key button, an OK button, and a playback button etc.

Among these operation members, if the power supply button is operated the camera is powered on, and if it is pressed again the camera is powered off. If the release button is operated, shooting of still pictures is carried out. If the movie button is operated movie shooting will start, and if the movie button is operated again the movie shooting will stop. It is possible to select various camera modes by operating the camera mode selection dial. By operating the menu button, it is possible to display a menu screen on the rear surface liquid crystal monitor 29, and perform various camera settings on this menu screen. The cross-shaped button can causes a cursor to move on the menu screen or the like, and it is possible to confirm items that have been selected using the cursor by operating the OK button.

The microcomputer 25 comprises a control section for controlling the entire camera, and carries out control over each section of the camera in accordance with a program stored in memory, such as flash ROM (not shown), based on detection signals from the operation section 21 and signals from other circuits. The microcomputer 25 also performs creation of image files.

The microcomputer 25 also functions as a control section, and carries out exposure in the imaging section 11 by dividing a time corresponding to a single frame of a movie into a plurality of time periods to acquire a plurality of image data. Also, as a function of the control section, positional alignment is carried out for subject images of a plurality of image data that have been acquired by carrying out a plurality of divided exposures, and the plurality of image data are combined, and stored as still picture data. Also, as a function of the control section, a plurality of image data are combined without carrying out positional alignment for subject images of a plurality of image data that have been acquired by carrying out a plurality of divided exposures, and stored as a single frame of movie data. This divided exposure, and generation of composite images for still pictures and a movie, will be described later using FIG. 5 to FIG. 7.

As a further function of the control section, a number of the above described divisions is set based on amount of hand-shake that has been detected by the movement amount detection circuit 15 which functions as a hand-shake amount detection section. Further, as a function of the control section, in the case where the amount of hand-shake is larger than a predetermined amount, a plurality of image data are combined by carrying out positional alignment for subject images, and stored as a single frame of movie data. The positional alignment at this time is carrying out positional alignment of subject images based on movement amount of subject images that has been detected by the movement amount detection circuit 15 which functions as a hand-shake amount detection section. Also, as a function of the control section, when performing positional alignment of a plurality of subject images, the position of a subject image of one image data, among the plurality of image data, is aligned with a position of a subject image of image data that was initially acquired, among the plurality of image data.

As a still further function of the control section, when combining movie data using a plurality of image data, in the case were amount of hand-shake that has been detected by the movement amount detection circuit 15 is larger than a first specified amount, a plurality of image data that were obtained consecutively from among the plurality of image data are combined without carrying out positional alignment of a subject image to create a plurality of composite image data, positional alignment is carried out for a subject image of the plurality of composite image data, and stored as a single frame of movie data. This control method is type 4, which will be described later, and will be described in detail using FIG. 6 and FIG. 10. As another function of the control section, in the case where type 4 is executed, positional alignment is carried out for a subject image of a plurality of composite images based on amount of subject image movement between a plurality of image data that have been combined without carried out positional alignment.

As a function of the control section, when combining movie data using a plurality of image data, in the case were amount of hand-shake that has been detected by the movement amount detection circuit 15 is larger than a second specified amount that is larger than a first specified amount, a plurality of image data are combined by carrying out positional alignment of a subject image, and stored as a single frame of movie data. This control method is type 5, which will be described later, and will be described in detail using FIG. 8, FIG. 11, FIG. 17, and FIG. 19.

As a further function of the control section, in the imaging section 11 which functions as an imaging processing section, exposure is carried out by dividing a time corresponding to a single frame of a movie, with respect to a plurality of frames of the movie, into a longer time and a shorter time, allowing acquisition of a plurality of image data. Also, as a function of the control section, positional alignment of a subject image is carried out to combine image data corresponding to the shorter time exposure, with respect to the plurality of frames, and store as still picture data, and image data corresponding to the longer time exposure, with respect to the plurality of frames, is stored as respective single frames of the plurality of frames of the movie.

Also, as a function of the control section, with respect to a plurality of frames, after carrying out exposure corresponding to a shorter divided time within a single frame, exposure corresponding to a longer divided time is carried out. Details of this control method will be described later using FIG. 7. Also, as a function of the control section, with respect to the plurality of frames, image data corresponding to the longer exposure time is multiplied by a gain for compensating for a shortfall in exposure time when exposure has been carried out by dividing the time corresponding to a single frame of a movie into a longer time and a shorter time, and stored as respective single frames of a plurality of frames of a movie. Also, as a function of the control section, a ratio for dividing the long time and the short time is set based on a detected amount of hand-shake.

The RAM 27 is a rewritable memory, and is used for temporary storage of data for processing by the microcomputer 25, and is used for temporary storage of image data.

The rear surface liquid crystal monitor 29 includes a liquid crystal panel arranged on the rear surface or the like of the camera body, and performs image display. As image display modes, there are Quickview Display for displaying stored image data for only a short time, playback display of image files for still pictures and movies that have been stored in the storage medium 35, movie display such as liveview display, and menu screens etc. The display section is not limited to a liquid crystal monitor, and other display panels such as organic EL etc. may also be adopted. The EVF 31 is an electronic viewfinder for displaying a subject image based on image data from the imaging section 11, and the user views it through an eyepiece.

The I/F 33 is an interface for storing image data in the storage medium 35, or reading out image data that is being stored, and is connected to the storage medium 35. The storage medium 35 is a storage medium such as a memory card that can be loaded into and taken out of the camera body, for example, but this is not limiting and it may also be a hard disk or the like built into the camera body 100.

Figure 2:
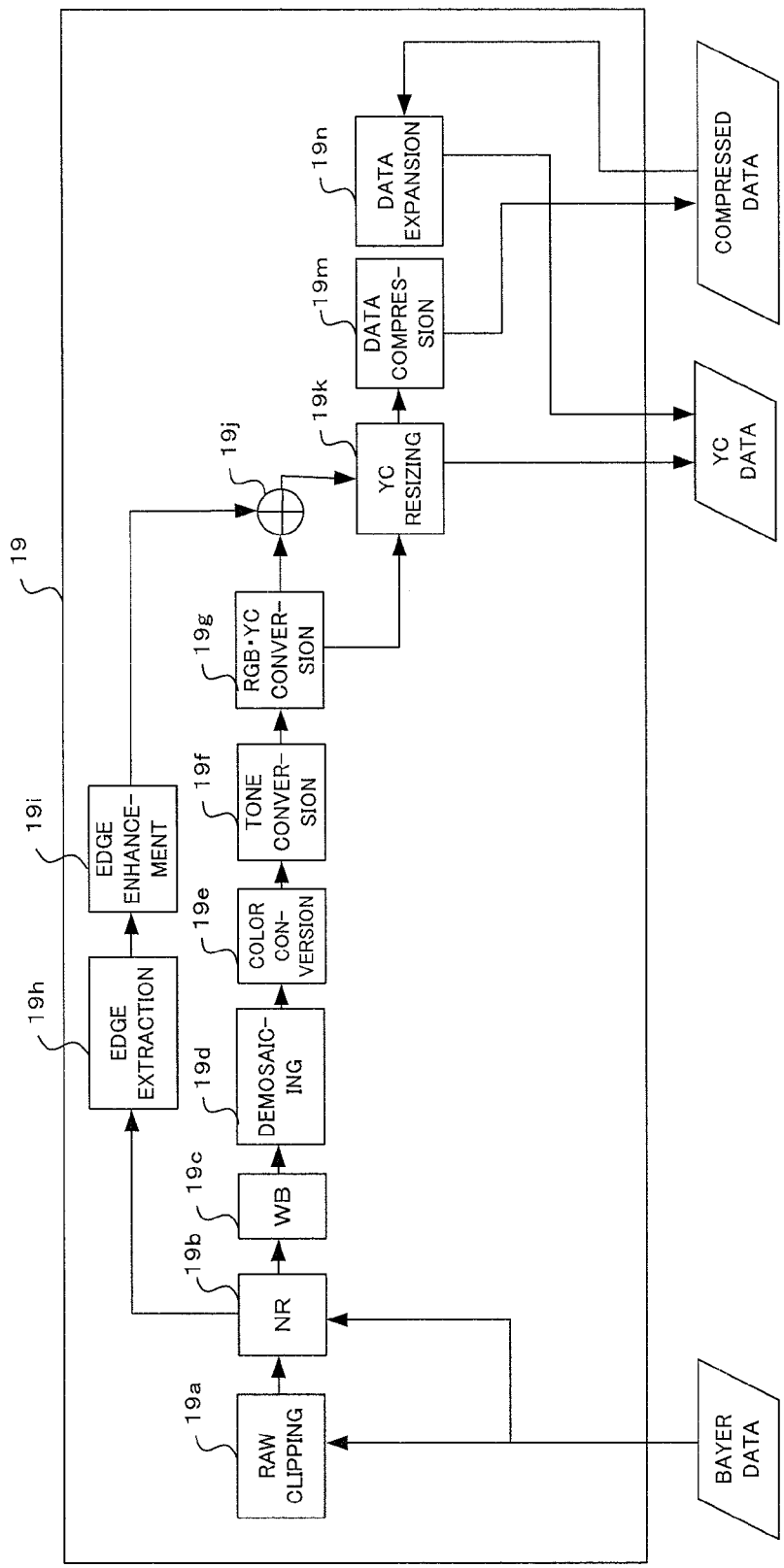
FIG. 2 is a block diagram showing details of image processing circuits of a camera of one embodiment of the present invention.

Next, details of the image processing circuit 19 will be described using FIG. 2. The image processing circuit 19 comprises a RAW clipping section 19a, an NR section 19b, a WB section 19c, a demosaicing section 19d, a color conversion section 19e, a tone conversion section 19f, an RGB•YC conversion section 19g, an edge extraction section 19h, an edge enhancement section 19i, a mixer section 19j, a YC resizing section 19k, a data compression section 19m, and a data expansion section 19n.

The RAW clipping section 19a is input with Bayer data of a movie, and performs change to clipping position and resizing of image data. Change to clipping position of the movie image data is carried out so as to reduce the influence of hand-shake, based on movement amount data from the movement amount detection circuit 15. Resizing is also carried out to make the image data small. Image data that has been subjected to clipping position change and resizing of image data is output to the NR section 19b.

The NR section 19b performs frequency decomposition on movie image data that has been input from the RAW clipping section 19a or on still picture image data that has been directly input via the bus 23, and carries out processing to reduce noise in accordance with the frequencies. Since still picture image data is not subjected to change in clipping position, in this embodiment Bayer data is input directly to the NR section 19b.

The WB section 19c is input with image data that has been subjected to noise reduction processing from the NR section 19b, and carries out white balance correction. Specifically, correction is carried out by reading out R gain and B gain corresponding to a white balance mode set by the user from a non-volatile memory such as the flash ROM of the camera body, and multiplying the image data of the Bayer array by these values. Alternatively, in the case of auto white balance, R gain and B gain are calculated from Bayer data (RAW data), and correction is carried out using these values.

The demosaicing section 19d is input with image data that has been subjected to white balance correction from the WB section 19c, and carries out demosaicing processing. Specifically, data not at that pixel position is obtained by interpolation from around that pixel position, and converted to RGB data.

The color conversion section 19e is input with image data that has been subjected to demosaicing processing by the demosaicing section 19d, and converts the color of the image data. Here, a linear transformation to multiply the image data by a color matrix coefficient according to the set white balance mode is carried out, to convert the color of the image data.

The tone conversion section 19f is input with image data that has been color converted by the color conversion section 19e, and carries out tone conversion. Here, a gamma table that is stored in nonvolatile memory is read out, and tone conversion is carried out for the image data.

The RGB•YC conversion section 19g is input with RGB data that has been tone converted by the tone conversion section 19f, and converts to YC data. YC data is image data formed from a brightness signal and color signal.

The edge extraction section 19h is input with image data that has been subjected to noise reduction processing from the NR section 19b, carries out edge extraction, and outputs the image data that has been subjected to edge extraction to the edge enhancement section 19i. Image data consisting of only outlines of the subject image is created by the edge extraction section 19h, and the edge enhancement section 19i.

The mixer section 19j carries out superimposing processing of image data consisting of only outlines that has been output from the edge enhancement section 19i upon image data consisting of a brightness signal that has been output from the RGB•YC conversion section 19g, and outputs the image data that has been subjected to the superimposing processing to the YC resizing section 19k.

The YC resizing section 19k is input with a brightness signal output from the mixer section 19j and a color signal output from the RGB•YC conversion section 19g, and carries out processing to generate YC data that makes image data small. The size of the image data is set depending on whether or not there is liveview display, or made a set size in the event that image storage will be carried out. The resized YC data is output to the bus 23 and the data compression section 19m.

The data compression section 19m is input with YC data from the YC resizing section 19k, and carries out compression processing such as JPEG in the case of still picture data, or compression processing such as MPEG in the case of movie data, outputting the compressed data to the bus 23. This compressed image data is stored in the storage medium 35.

The data expansion section 19n is input, via the bus 23, with compressed data that has been stored in the storage medium 35, and carries out expansion processing on the image data that has been compressed using JPEG or MPEG, to output expanded YC data by means of the bus 23.

Figure 5:
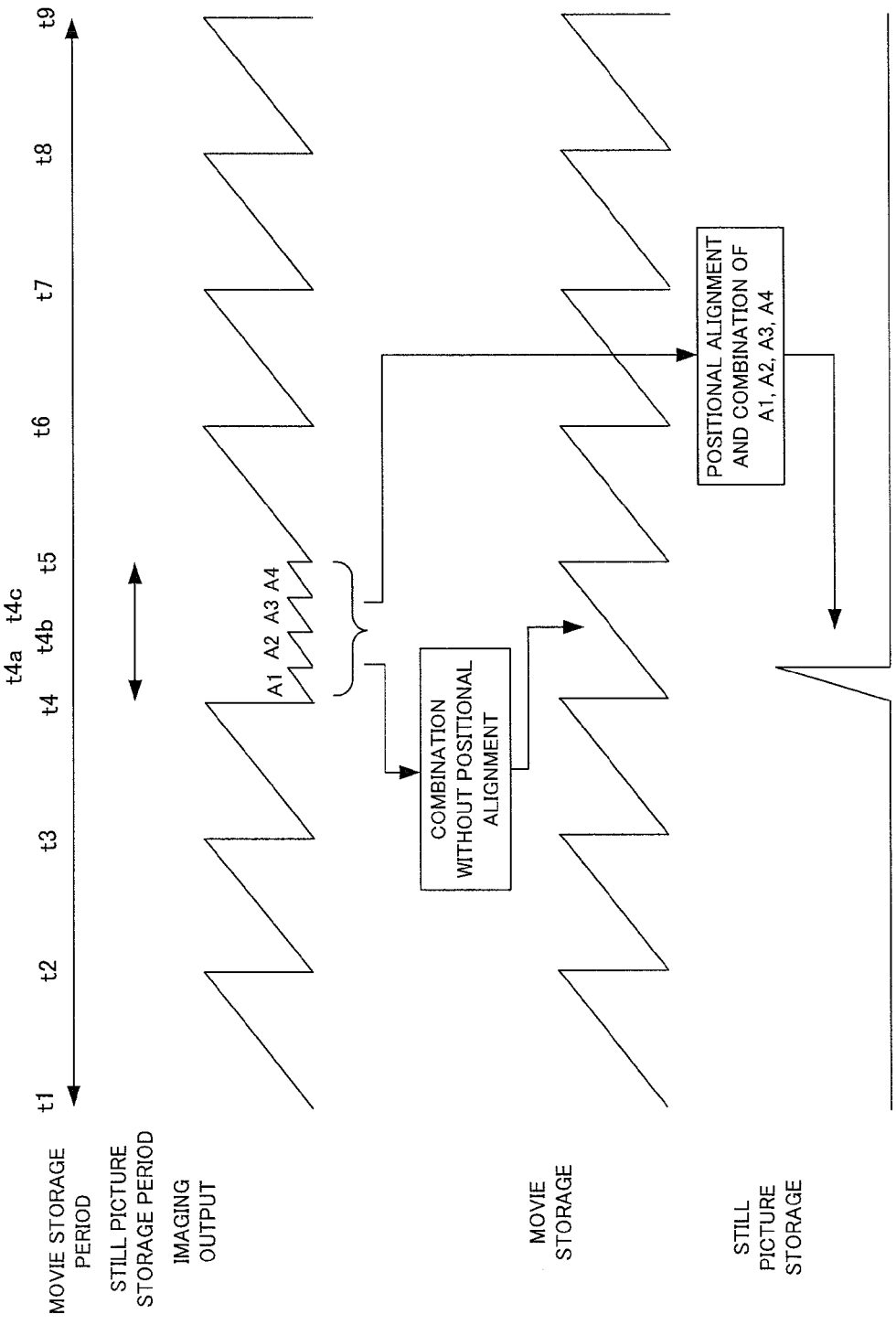
FIG. 5 is a timing chart showing a basic storage method at the time of shooting movie and still pictures in a camera of one embodiment of the present invention.

Next, the case of operating the release button during shooting of the movie to shoot still pictures, in the present invention, will be described using the schematic diagram shown in FIG. 5. As will be described later, this processing is referred to as type 3. In FIG. 5, the horizontal axis represents the flow of time. From time t1 to t4 only movie shooting is being carried out and still pictures are not being shot. During this time, images are exposed for a single frame from time t1 to t2, for a single frame from time t2 to t3, for a single frame from time t3 to t4, respectively read out upon completion of exposure, and stored as movie image data in the storage medium 35.

If the release button is operated during the period from time t3 to t4, shooting of still pictures and a movie is carried out from time t4 to t5. In the case of shooting still pictures and the movie, the exposure time for the period from time t4 to t5 is divided into 4, with image A1 being taken (exposed) from time t4 to t4a, image A2 being taken from time t4a to t4b, image A3 being taken from time t4b to t4c, and image A4 being taken from time t4c to t4d. Movie image data for storage is not subjected to image positional alignment by the combining processing circuit 17, and a composite image is created by simply superimposing (addition processing) image data, and movie storage is carried out.

On the other hand, for still picture image data for storage, the combining processing circuit 17 carries out positional alignment for images A1-A4 based on movement amount data that has been detected by the movement amount detection circuit 15, and image combination is carried out. Respective exposure times for the images A1 to A4 are ¼ of the exposure time for a normal single frame, and positional alignment is carried out for respective images, which means that it is possible to reduce the influence of hand-shake to ¼ (equivalent to a two-stop aperture increase).

Also, in carrying out positional alignment of each image, alignment is carried out to the image A1 that was taken during time t4 to t4a, that is, the image immediately after operation of the release button. As a result, time lag at the time of taking still pictures is significantly reduced.

At time t5, if shooting of still pictures is completed, then similarly to time t1 to t4, only movie shooting is carried out from time t5 to t9, and still picture shooting is not carried out.

In this way, when the release button is operated during movie shooting and shooting of still pictures is carried out, exposure is carried out by dividing a time corresponding to a single frame of a movie into a plurality of time periods to acquire a plurality of image data. Then, positional alignment of subject images of the plurality of image data is carried out to combine a plurality of image data, and stored as still picture data, while a plurality of image data are combined without carrying out positional alignment of the subject image of the plurality of image data and stored as a single frame of movie data.

Therefore, the movie image data is taken under substantially the same exposure conditions in time t1 to t4 and time t4 to t9, and so it is possible to prevent variation in quality of a movie only during still picture shooting, and no uneasy feeling is caused at the time of playback. On the other hand, with still picture shooting, since the exposure time has effectively become a short time, it is possible to obtain a high-quality image with a reduced influence from hand-shake.

Next, a first modified example of processing in the case of operating the release button during shooting of a movie and shooting still pictures will be described using the schematic diagram shown in FIG. 6. With the example shown in FIG. 5, when shooting a movie, only positional alignment was carried out but the effects of hand-shake were not reduced. However if the effects of hand-shake become large image quality of the movie is also lowered, and so with this modified example positional alignment is also carried out for a movie. As will be described later, this processing is referred to as type 4.

Figure 6:
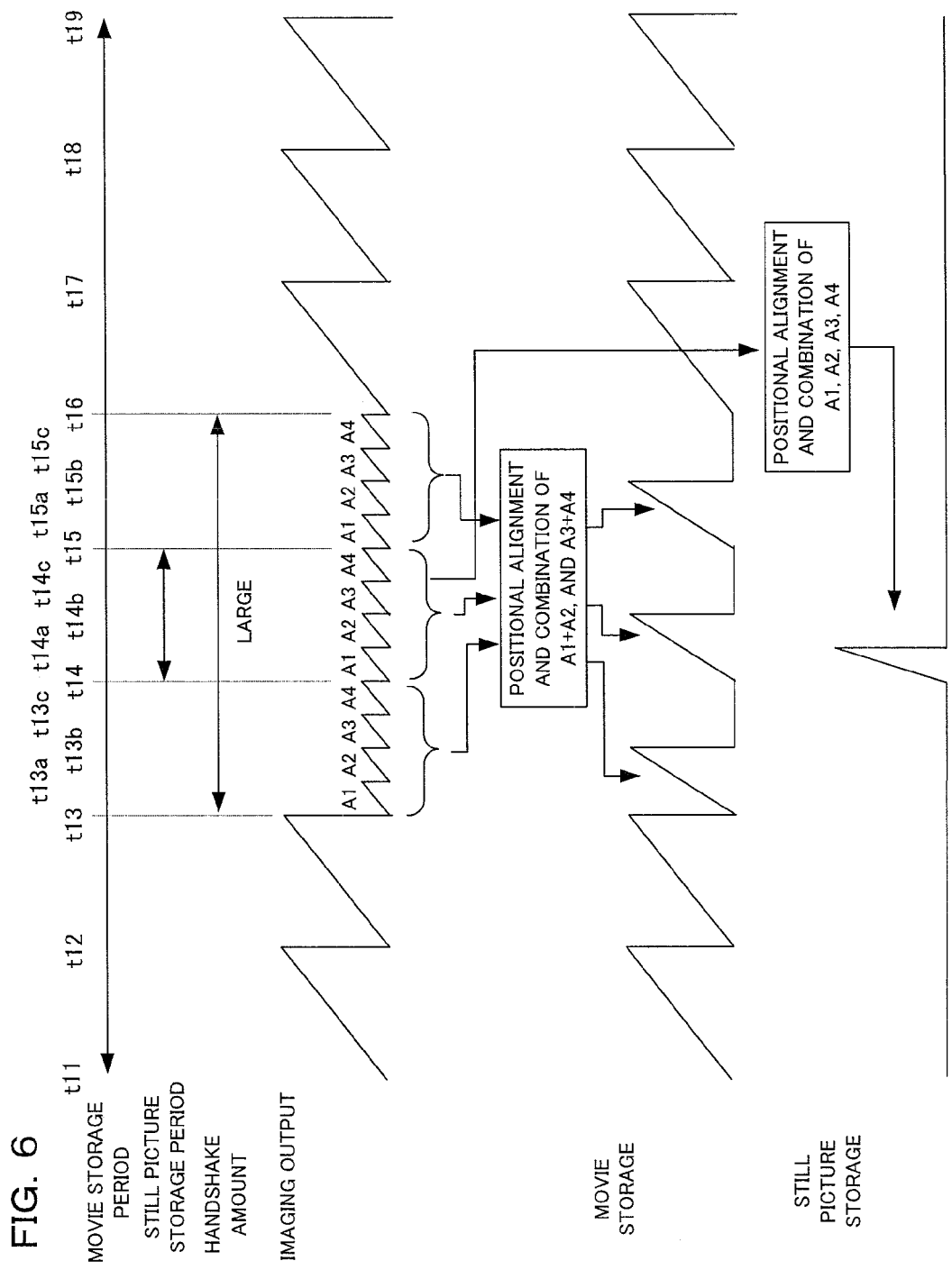
FIG. 6 is a timing chart showing a first modification of a storage method at the time of shooting movie and still pictures in a camera of one embodiment of the present invention.

In FIG. 6 also, the horizontal axis represents the flow of time. From time t11 to t13, similarly to time t1 to t4, only movie shooting is being carried out and still pictures are not being shot. From time t13 until time t16 the influence of hand-shake was also large for movie shooting. During this time, similarly to the case of time t4 to t5 in FIG. 5, respective images A1 to A4 are acquired by dividing a single frame into four.

Movie image data for storage in time t13 to t16 is not subjected to positional alignment of images A1 and A2 for each frame by the combining processing circuit 17 and a composite image (A1+A2) is created by simply superimposing image data (addition processing), and similarly positional alignment is not carried out for images A3 and A4 and a composite image (A3+A4) is created by simply superimposing image data (addition processing). Continuing on, the combining processing circuit 17 performs positional alignment of the 2 composite images that have been combined, based on movement amount data from the movement amount detection circuit 15, to combine image data. The composite image data is stored as a single frame of movie data.

If time t14 is reached, shooting of still pictures is carried out, in addition to a movie, during time t14 to t15. Shooting of still pictures at this time is similar to the example shown in FIG. 5, and for divided images A1-A4 during time t14-t15, positional alignment of each image is carried out by the combining processing circuit 17 based on movement amount data, followed by image superimposing processing.

In this way, with the first modified example, in addition to the basic processing shown in FIG. 5, when hand-shake amount is large positional alignment of divided images is also carried out for a movie. As a result even if the amount of hand-shake is large it is possible to alleviate the effects of hand-shake for a movie also.

In this modified example, image A1 and image A2 were simply added, and similarly image A3 and image A4 were simply added, and positional alignment was carried out for these added images. However, in the event that hand-shake is not sufficiently alleviated by this processing, then similarly to the case of still pictures, it is also possible to carry out positional alignment respectively for the images A1, A2, A3 and A4 according to the amount of hand-shake. This control method will be described later as type 5, in FIG. 8, FIG. 11, FIG. 17, and FIG. 19.

Next, a second modified example of processing in the case of operating the release button during shooting of a movie, to shoot still pictures, will be described using the schematic diagram shown in FIG. 7. With the example shown in FIG. 5 and FIG. 6, if hand-shake amount is large the span of a single frame is divided into equal parts. However, with this modified example, image data is acquired at times resulting from dividing a single frame into unequal parts, with still pictures being generated by combining a plurality of images that were taken over short times, while a movie is generated by subjecting respective movie images that were taken over long times to gain increase.

Figure 7:
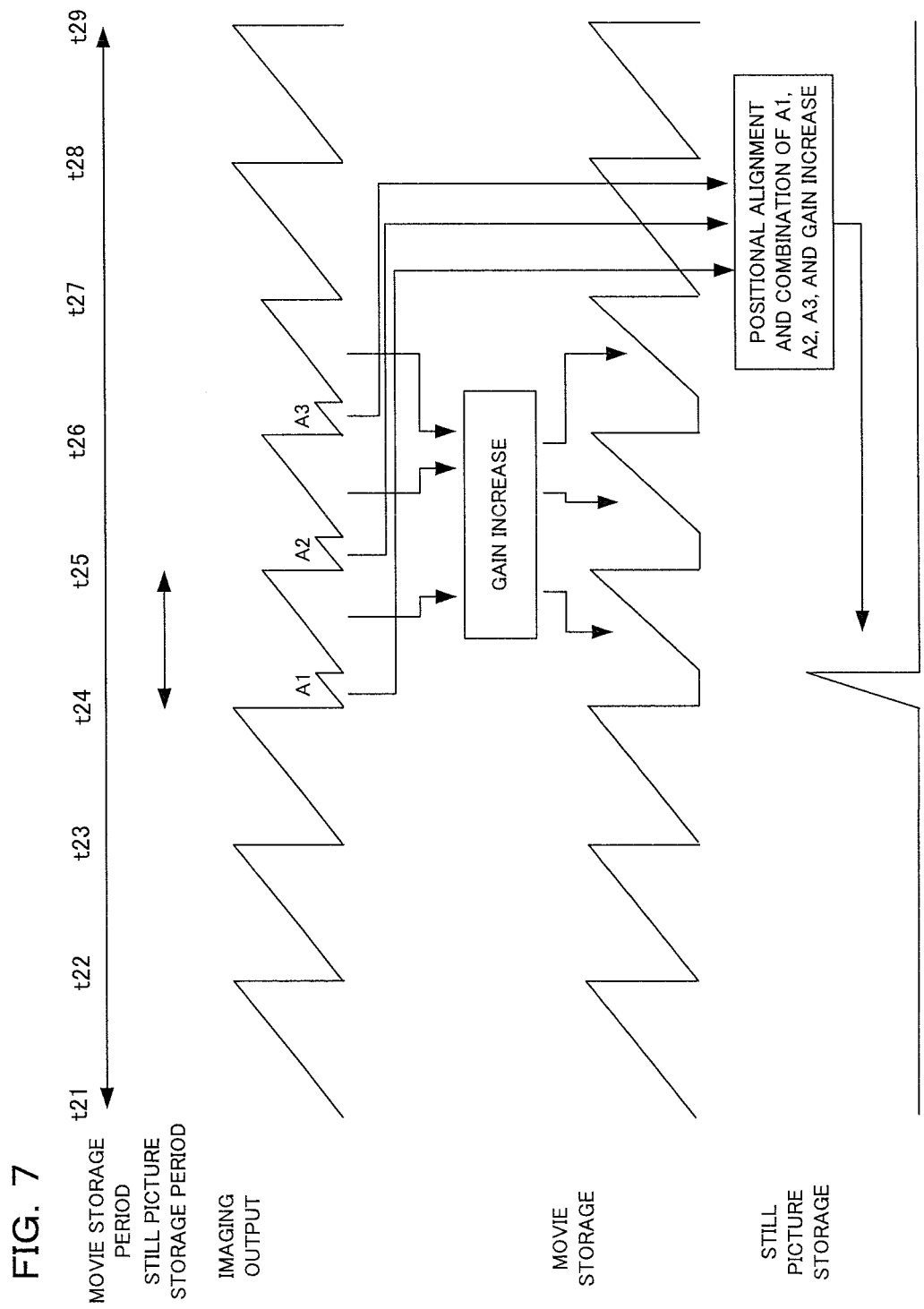
FIG. 7 is a timing chart showing a second modification of a storage method at the time of shooting movie and still pictures in a camera of one embodiment of the present invention.

In FIG. 7, at time t21-t24, and time t27-229, similarly to time t1-t4 and time t5-t9 in FIG. 5, only the movie shooting is carried out and shooting of still pictures is not carried out.

If time t24 is reached, still picture and movie shooting are carried out. When shooting still pictures and a movie, the time of each frame is divided into two at a ratio of 1:3 in time t24-t27, and images A1, A2 and A3 are obtained at times ahead of each frame. The obtained images A1-A3 are subjected to positional alignment by the combining processing circuit 17 based on movement amount data, and by subjecting the positionally aligned images A1-A3 to superimposing processing still picture image data is created. The created image data is stored in the storage medium 35.

On the other hand, movie image data is obtained by subjecting movie image data that was acquired at time t24-t27 to a gain increase in the imaging section 11, and this image data is stored in the storage medium 35. With the example shown in FIG. 7, each item of movie image data is for an exposure time of 3/4 that of a normal single frame, and so the gain increase can be 4/3 times.

In this way, with the second modified example, when shooting of still pictures is carried out during movie shooting, exposure is carried out by dividing a time corresponding to a single frame of a movie, with respect to a plurality of frames of movie, into a longer time and a shorter time, and a plurality of image data are acquired. Then, for still picture image data, positional alignment of a subject image is carried out to combine image data corresponding to the shorter time exposure, with respect to the plurality of frames, while on the other hand, for movie image data, image data corresponding to the longer time exposure, with respect to the plurality of frames, is stored as respective single frames of the plurality of frames. Also, exposure corresponding to a previous short time is carried out, and then exposure corresponding to the next long time is carried out. As a result, time lag of still pictures can be effectively shortened.

Since the movie image data is generated by increasing the gain it is possible to process with a simple structure and still picture image data can be obtained out high quality with reduced hand-shake. With this modified example, images are obtained with the time of a single frame divided at the ratio of 1:3, but the ratio for dividing can be altered as appropriate. This division ratio may also be set based on amount of hand-shake that has been detected by the movement amount detection circuit 15.

Figure 8:
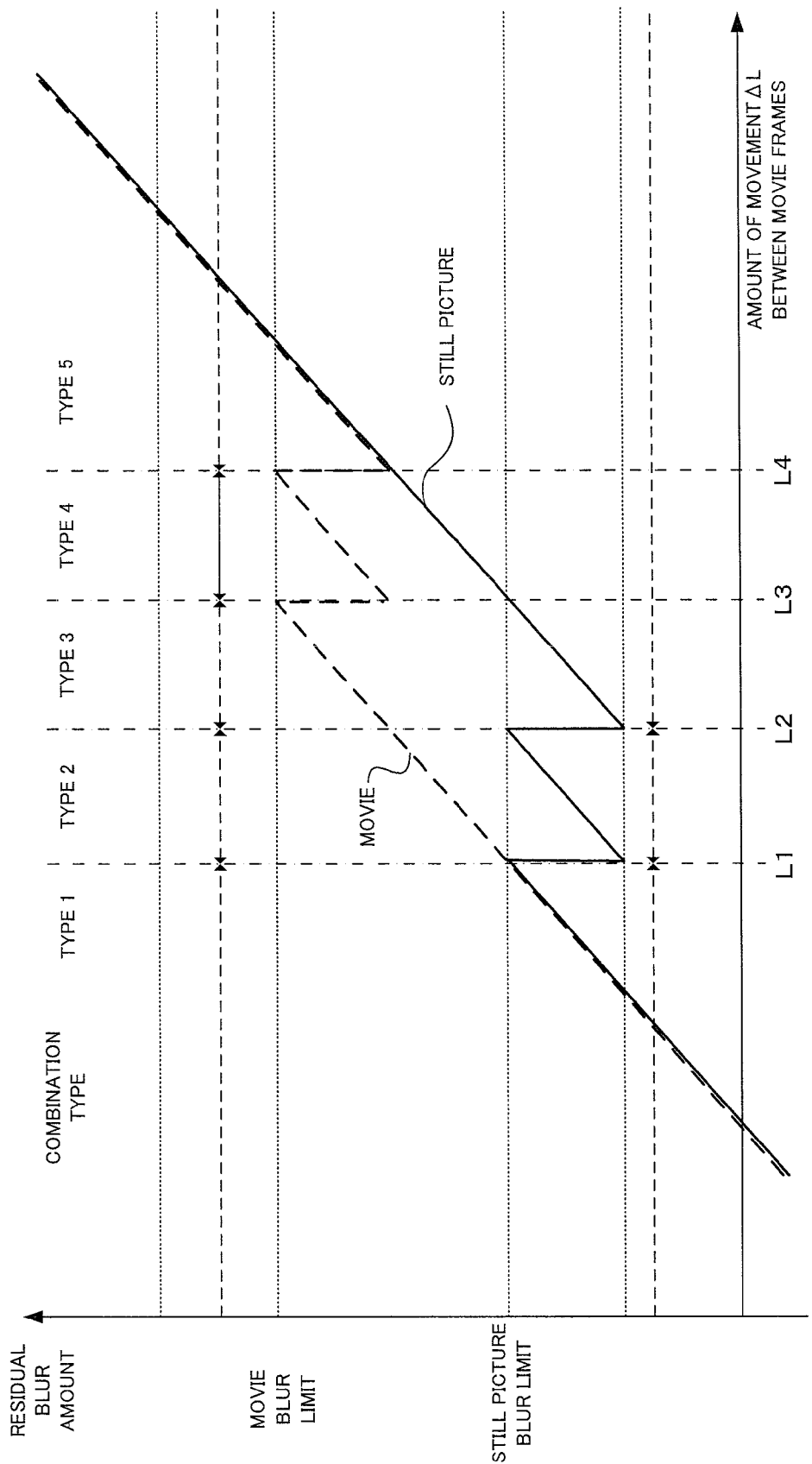
FIG. 8 is a graph showing a relationship between amount of movement between movie frames and type of combination and residual blur amount, in a camera of one embodiment of the present invention.

Next, a movie shooting operation of one embodiment of the present invention will be described. With this embodiment, as shown in FIG. 8, the processing shown in FIG. 5 and FIG. 6 is appropriately switched between type 1-type 5 in accordance with movement amount ΔL between movie frames. The vertical axis in FIG. 8 is residual blur amount, with still picture blur limit and movie blur limit being shown on the vertical axis. Residual blur amount means either simply blur amount, or a blur amount after processing to reduce blur has been applied. A movie is shooting of a subject that has movement, and generally still pictures will have higher resolution, which means that the movie blur limit has a larger value than the still picture blur limit.

In a case where the movement amount ΔL between the movie frames is between 0-L1, type 1 control is carried out, as shown in FIG. 8. With type 1 combination processing is not carried out for either a movie or still pictures. Specifically, image data that has been acquired by the imaging section 11 is subjected to image processing without carrying out the combination processing as was described in FIG. 5 and FIG. 6, and then stored in the storage medium 35.

In a case where movement amount ΔL between movie frames is between L1-L2, type 2 control is carried out. This type 2 control carries out combination without two-frame positional alignment for movies, and carries out combination with two-frame positional alignment for still pictures. Type 2 control has not been described in detail, but is a modified example of the previously described processing of FIG. 5.

Specifically, with type 2, since the amount of movement ΔL between movie frames exceeds the still picture blur level but does not exceed the movie blur level, processing to reduce blur is applied to the still pictures. With the processing of FIG. 5, exposure time for a single frame was divided into four, but with type 2 this division is a division into two parts. Then, for the still picture image data, image data that was respectively acquired in the two divided exposure times is positionally aligned by the combining processing section 17 based on movement amount data, then subjected to superimposing processing to generate a composite image, which is stored. For movie image data, the respectively acquired image data is not positionally aligned by the combining processing section 17, but simply subjected to superimposing processing to generate a composite image, which is stored.

In a case where the movement amount. ΔL between the movie frames is between L2-L3, type 3 control is carried out. This type 3 control is combination for a movie without positional alignment of each image that has been divided into four (combination without 4 frame positional alignment), and combination for a still picture after carrying out positional alignment of each image that has been divided into four (4 frame positionally aligned combination). Since the type 3 control is the same as the processing described previously for FIG. 5, detailed description will be omitted.

In a case where the movement amount ΔL between the movie frames is between L3-L4, type 4 control is carried out. This type 4 control is combination for a movie with 2+2 frame positional alignment, and combination for a still picture after carrying out positional alignment of each image that has been divided into four. For the still picture, control is the same as for type 3, but because the movie blur limit has been exceeded processing to reduce hand-shake is also carried out for the movie. Since the type 4 control is the same as the processing described previously for FIG. 6, detailed description will be omitted.

In a case where the movement amount ΔL between the movie frames is greater than L4, type 5 control is carried out. Here, since the amount of movement ΔL between movie frames is even greater than for the case of type 4, then similarly to the case of the still picture, for the movie also positional alignment is carried out for each divided image that has been divided into 4 (4-frame positionally aligned combination), and the effect of hand-shake is reduced. Type 5 control is generating movie image data by carrying out positional alignment, in accordance with movement amount, for each of images A1-A4, without the generation of an image of A1+A2 and A3+A4, in FIG. 6 described previously.

In this way, with this embodiment, control of type 1-type 5 is carried out taking into consideration the movie blur limit and the still picture blur limit, in accordance with amount of movement between movie frames. As a result it is possible to carry out optimum control with respect to movie and still picture quality, and smoothness of the movie.

Next, operation in the case of type 3 will be described using the timing chart shown in FIG. 9. As has been described using FIG. 5, at the time of shooting only a movie, image data that has been subjected to image processing is stored as is in the storage medium 35, while in the case of also shooting still pictures while shooting a movie, exposure time for a single frame is divided into 4 equal periods and image data for a movie is generated by combining each of the taken images without performing positional alignment of those images, while on the other hand generation of image data for still pictures is carried out by combining each of the images after performing positional alignment for each of the images.

Figure 9:
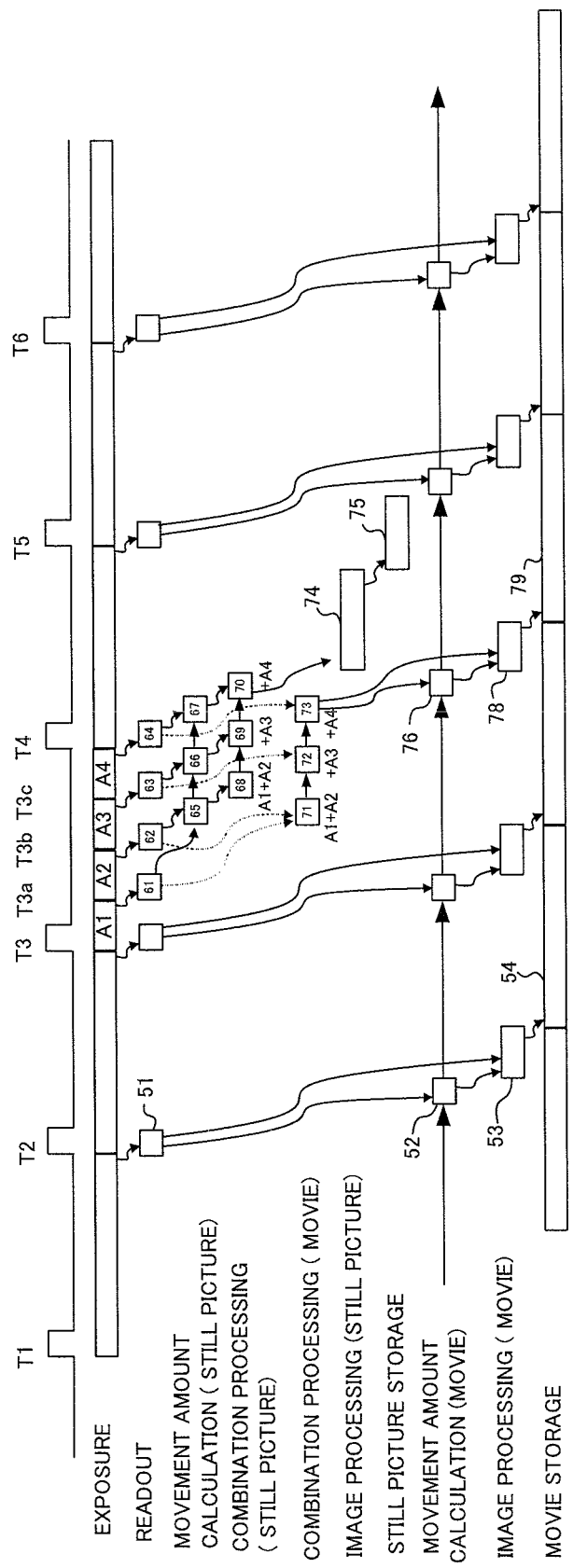
FIG. 9 is a timing chart for a case where residual blur amount is type 3, in a camera of one embodiment of the present invention.

In the timing chart shown in FIG. 9, at time T1-T3 and time T4-T6, only movie shooting is carried out, and still picture shooting is not carried out. Image data that has been taken during time T1-T2 is read out at time 51. Also, at a time 52, image data that was read out at a time 51 and image data that was read out at a time prior to that are compared to calculate a movement amount. Then, at time 53, image data that was read out at time 51 and the image data that was read out at a time prior to that are directly superimposed without carrying out positional alignment to generate a movie, and after carrying out image processing movie image data is stored in the storage medium 35 at time 54. Similarly, movie image data is also generated from time T2-T6, and stored.

If time T3 is reached, shooting of still pictures and a movie is carried out during time T3-T4. For this shooting, as was described using FIG. 5, the exposure time of time T3-T4 is divided into 4 equal lengths, and images A1-A4 are respectively taken. Image A1 is read out at time 61, image A2 is read out at time 62, image A3 is read out at time 63, and image A4 is read out at time 64.

At time 65, movement amount for image A2 is calculated with image A1 as a reference, using image data that was read out at times 61 and 62. Similarly, at time 66, movement amount for image A3 is calculated with image A1 as a reference, using image data that was read out at time 63. Similarly, at time 67, movement amount for image A4 is calculated with image A1 as a reference, using image data that was read out at time 64.

Also, at time 68 positional alignment of image A2 with image A1 is carried out using the movement amount that was calculated at time 65, to generate a composite image (A1+A2). At time 69 positional alignment of image A3 with image A1+A2 is carried out using the movement amount that was calculated at time 66, to generate a composite image (A1+A2+A3). At time 70 positional alignment of image A4 with image A1+A2+A3 is carried out using the movement amount that was calculated at time 67, to generate a composite image (A1+A2+A3+A4).

At time 74 image data of the composite image (A1+A2+A3+A4) for a still picture that was generated at time 70 is subjected to image processing by the image processing circuit 19. Still picture image data that has been subjected to image processing here is stored in the storage medium 35 at time 75.

Also, the images A1-A4 that were taken during time T3-T4 are used to generate a composite image for a movie by superimposing them directly each time image data is read out at times 61-64, without carrying out positional alignment, at times 71-73. This generated composite image is compared with movie image data that was generated the previous time, to calculate movement amount at time 76. Also, after image processing for the movie has been carried out at time 78, it is stored in the storage medium 35 as movie image data at time 79.

In this way, in type 3 control, in the case of shooting still pictures at the same time as a movie, exposure time for a single frame is divided into four, still picture image data is generated by superimposing divided images after they have been positionally aligned, and movie image data is generated by superimposing the divided images without carrying out positional alignment.

Figure 10:
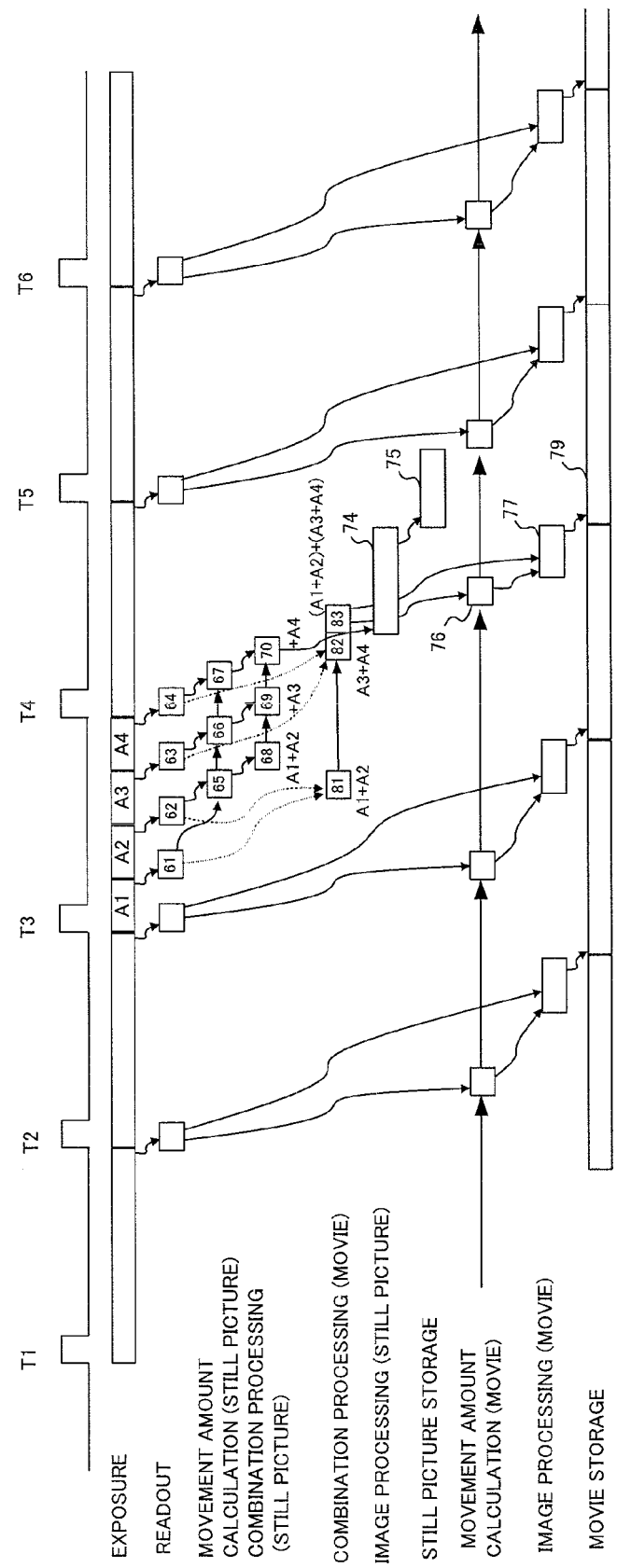
FIG. 10 is a timing chart for a case where residual blur amount is type 4, in a camera of one embodiment of the present invention.

Next, operation in the case of type 4 will be described using the timing chart shown in FIG. 10. As has been described using FIG. 6, with type 4, for still pictures, similarly to type 3, a composite image is generated by superimposing processing after positional alignment has been carried out for the four divided image data. Also, differing from the case of type 3, for a movie two composite images are generated from the four divided image data without carrying out positional alignment, and a composite image is then generated by carrying out positional alignment of the two generated composite images and performing superimposing processing. However, while in FIG. 6 composite images are also generated for a movie by carrying out positional alignment for three frames of times t13-t16, in the example shown in FIG. 10 type 4 control is only carried out for a single frame from time T3 until time T4.

For the still picture image generation of type 4, since it is the same as FIG. 9, the same reference numerals will be assigned to times where the same processing is carried out, and detailed description will be omitted.

In image generation for a movie with type 4, at time 81 a composite image (A1+A2) is generated by carrying out superimposing processing directly on image A1 that was read out at time 61 and image A2 that was read out at time 62, without carrying out positional alignment. Also, at time 82 a composite image (A3+A4) is generated by carrying out superimposing processing directly on image A3 that was read out at time 63 and image A4 that was read out at time 64, without carrying out positional alignment.

Once the composite image (A1+A2) and the composite image (A3+A4) have been generated, positional alignment of the composite image (A1+A2) and the composite image (A3+A4) is carried out at time 83. This positional alignment is carried out using an amount of movement between the composite image (A1+A2) and the composite image (A3+A4), effectively an amount of movement between image A1 and image A3, using the movement amounts that were calculated at times 65-67. Once positional alignment has been carried out at time 83, a movement amount is next calculated at time 76, using an image that was read out the previous time and the image that has been subjected to positional alignment. Also, the image that was positionally aligned at time 83 is subjected to movie image processing at time 77, and stored in the storage medium 35 as movie image data at time 79.

In this manner, with type 4 control, when generating the movie image data the composite image (A1+A2) and the composite image (A3+A4) are generated, and then positional alignment of the two composite images is carried out. As a result even in a case where the amount of hand-shake is large it is possible to acquire image data for a movie in which hand-shake has been reduced.

Next, operation in the case of type 5 will be described using the timing chart shown in FIG. 11. With type 4 that was described using FIG. 6 (first modified example) and FIG. 10, after combining images two at a time, from among four divided images, without carrying out positional alignment, a composite image for a movie was generated by then combining these two composite images. Conversely, with type 5, a composite image for movie is generated by carrying out positional alignment respectively for the four divided images. Generation of still pictures is the same as for type 3.

Figure 11:
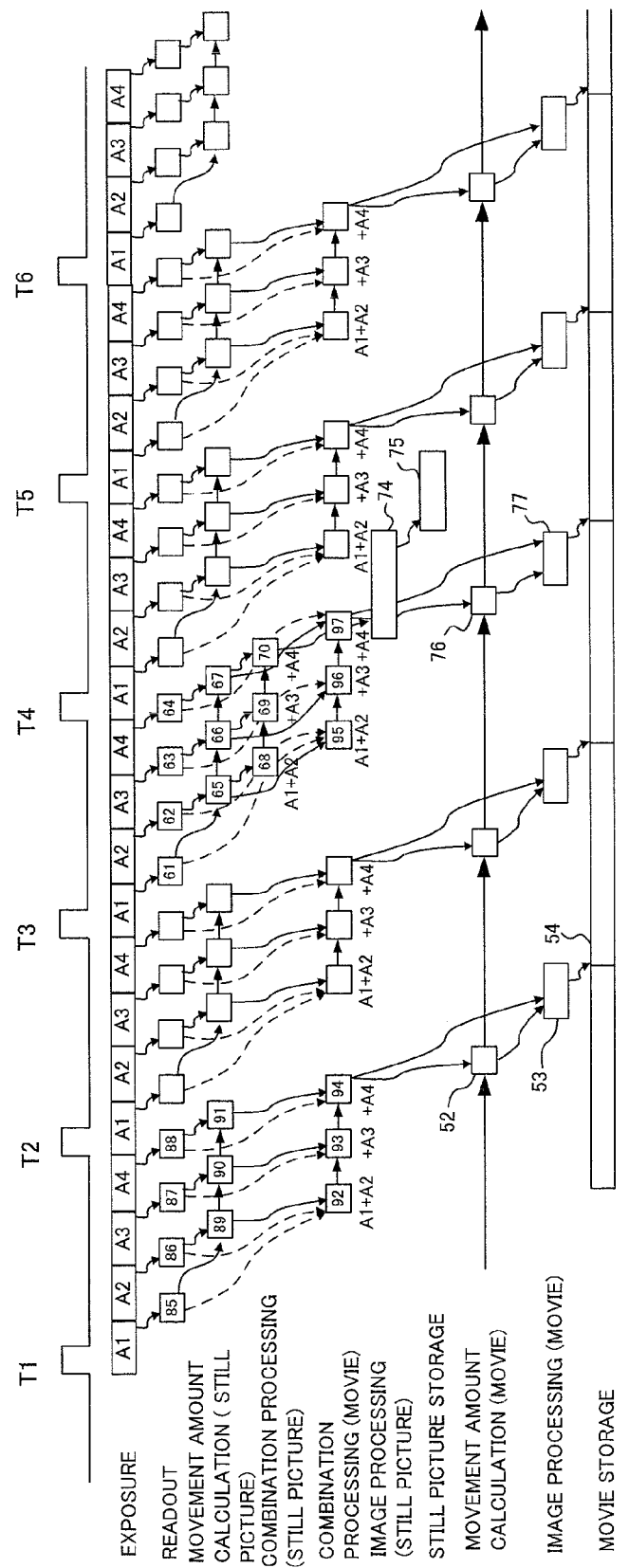
FIG. 11 is a timing chart for a case where residual blur amount is type 5, in a camera of one embodiment of the present invention.

In FIG. 11, from time T1-T6 movie shooting is carried out, and still picture shooting is carried out during time T3-T4. For the still picture image generation of type 5, since it is the same as FIG. 9, the same reference numerals will be assigned to times where the same processing is carried out, and detailed description will be omitted.

In the movie image generation of type 5, the movement amount detection circuit 15 calculates amount of movement with reference to image A1 at time 89, using image A1 that was read out at time 85 and image A2 that was read out at time 86. The movement amount calculated here is used at the time of positional alignment of still pictures and movies. Using the movement amount that was calculated at times 89, at time 92 a movie composite image (A1+A2) is generated by carrying out positional alignment of image A1 and image A2.

Using image A3 that was read out at time 87, a movement amount for image A3 with reference to image A1 is calculated at time 90. Using this calculated movement amount, at time 93 a movie composite image (A1+A2+A3) is generated by carrying out positional alignment of composite image (A1+A2) and image A3.

Using image A4 that was read out at time 88, a movement amount for image A4 with reference to image A1 is calculated at time 91. Using this calculated movement amount, at time 94 a movie composite image (A1+A2+A3+A4) is generated by carrying out positional alignment of composite image (A1+A2+A3) and image A4.

Once the movie composite image (A1+A2+A3+A4) has been generated, movement amount is calculated at time 52 using previous movie image data. Then, after image processing at time 53 has been carried out on the movie image data that was combined at time 94, it is stored in the storage medium 35 at time 54 as movie image data. Similarly, movie image data is also generated from time T2-T6, and stored.

Next, a second modified example of processing in the case of operating the release button during shooting of a movie and shooting still pictures, as was described using FIG. 7, will be described using the timing chart shown in FIG. 12. With this second modified example, shooting is carried out with a single frame divided into two unequal exposure times. A still picture is generated by carrying out positional alignment of a plurality of images that have been taken at the shorter exposure time, and for a plurality of images that have been taken at the longer exposure time a movie is generated by respectively applying gain increase. With the example shown in FIG. 7, the three images A1-A3 were combined to create a still picture, but with the example shown in FIG. 12 four images, images A1-A4, are combined to create a still picture.

Figure 12:
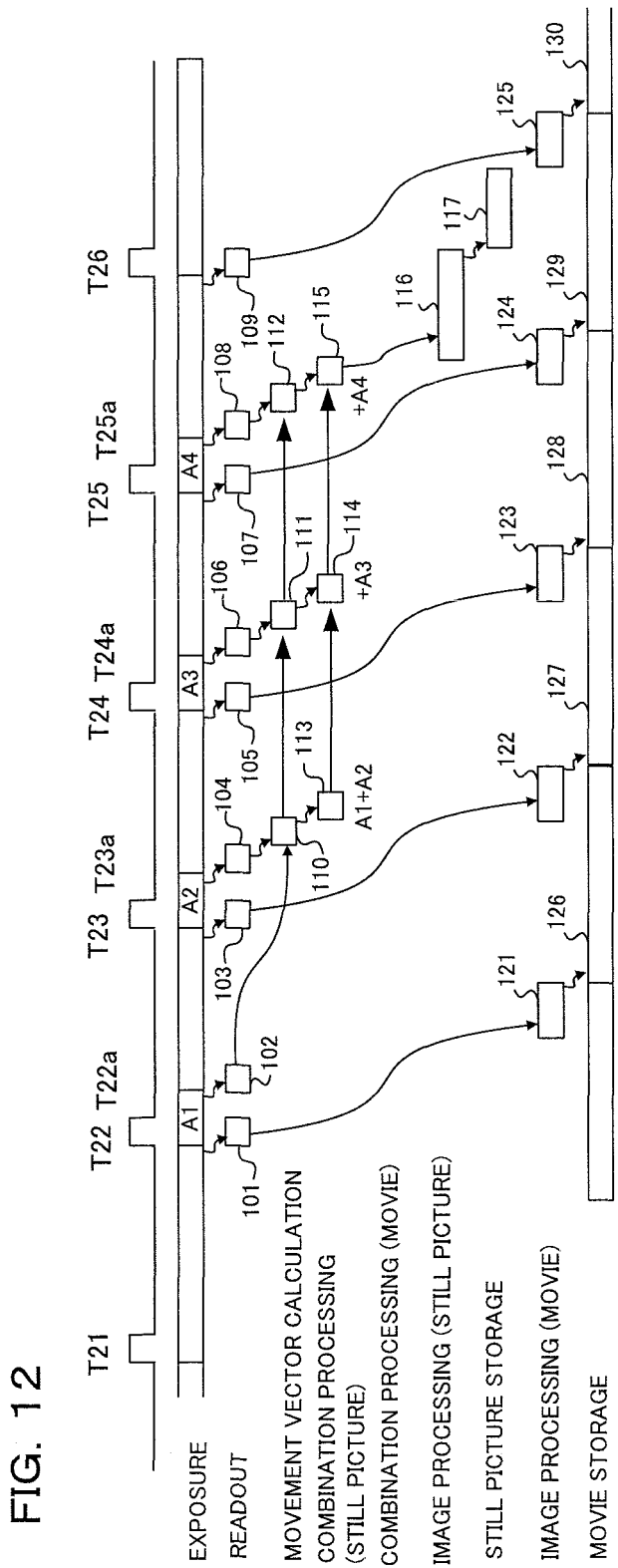
FIG. 12 is a timing chart of the first modification of the storage method in a camera of one embodiment of the present invention.

In the timing chart shown in FIG. 12, only movie shooting is carried out until time T22, and from time T22-T26, shooting is carried out for still pictures, and at this time the shooting for a movie is also carried out at the same time. Specifically, image A1 for still picture use is taken in time T22-T22a, image A2 for still picture use is taken in time T23-T23a, image A3 for still picture use is taken in time T24-T24a, and image A4 for still picture use is taken in time T25-T25a.

Image A1 is read out at time 102, image A2 is read out at time 104, and a movement vector is calculated at time 110 based on image A1 and image A2. Using this movement vector, at time 113 a composite still picture (A1+A2) is generated by carrying out positional alignment of image A1 and image A2, and then carrying out superimposing processing. Generation of the composite still picture is carried out by the combining processing circuit 17.

Also, image A3 is readout at time 106 and a movement vector is calculated at time at 111 from the composite still picture image (A1+A2) and image A3. Using this movement vector, at time 114 a composite still picture image (A1+A2+A3) is generated by carrying out positional alignment of the composite still picture image (A1+A2) and image A3, and then carrying out superimposing processing.

Also, image A4 is read out at time 108 and a movement vector is calculated at time 112 from the composite still picture image (A1+A2+A3) and image A4. Using this movement vector, at time 115 a composite still picture image (A1+A2+A3+A4) is generated by carrying out positional alignment of the composite still picture image (A1+A2+A3) and image A4, and then carrying out superimposing processing.

The composite still picture image (A1+A2+A3+A4) that was generated at time 115 is subjected to still picture image processing by the image processing section 19 at time 116. Once this image processing has been carried out, it is then stored in the storage medium 35 as still picture image data at time 117.

In this way, for a still picture, a composite still picture (A1+A2+A3+A4) is generated by positionally aligning a plurality of images A1-A4 that were exposed in the short periods at time T22-T22a, T23-T23a, T24-T24a, and T25-T25a, and stored. The exposure time for the plurality of images A1-A4 is a part of a single frame, and so the effect of hand-shake is reduced, and because a composite still picture is obtained by carrying out superimposing processing after positional alignment, it is possible to acquire a still picture that is also less affected by noise.

In the timing chart shown in FIG. 12, movie generation is carried out as follows. Prior to the time T22 only a movie is being shot, and images that were taken at the exposure time from time T21 to time T22 are read out at time 101. Then, the image processing circuit 19 carries out image processing for a movie at time 121, and stores in the storage medium 35 at time 126 as movie image data.

From time T22 shooting of still pictures is also carried out together with the shooting of a movie. Images for a movie are exposed in time T22a-T23, and read out at time 103. This read-out image data is subjected to movie image processing by the image processing circuit 19 at time 122. Also, when carrying out still picture shooting at the same time, since the exposure time becomes a shorter time than the normal exposure time for a single frame, image data is also subjected to gain increase at the time of image processing in order to compensate for the fact that the exposure time has been shortened. As an amount of gain increase, if the exposure time for a movie is m/n that of a single frame, gain is increased by n/m. For example if the exposure time from movie is 3/4 that for a single frame, the amount of gain increase becomes 4/3. Once image processing has been carried out the resulting image is stored in the storage medium 35 at time 127.

After that, movie image data is read out at times 105, 107 and 109, gain increased to compensate for the shortened exposure is carried out at times 123, 124 and 125, and then stored in the storage medium 35 at times 128, 129, and 130.

In this way, at the time of movie storage exposure time for a single frame is divided into unequal parts, and an image that has been taken in the longer exposure period, that has been subjected to gain adjustment, is stored. As a result it is possible to acquire image data for still pictures and movies without carrying out complex processing.

Figure 13:
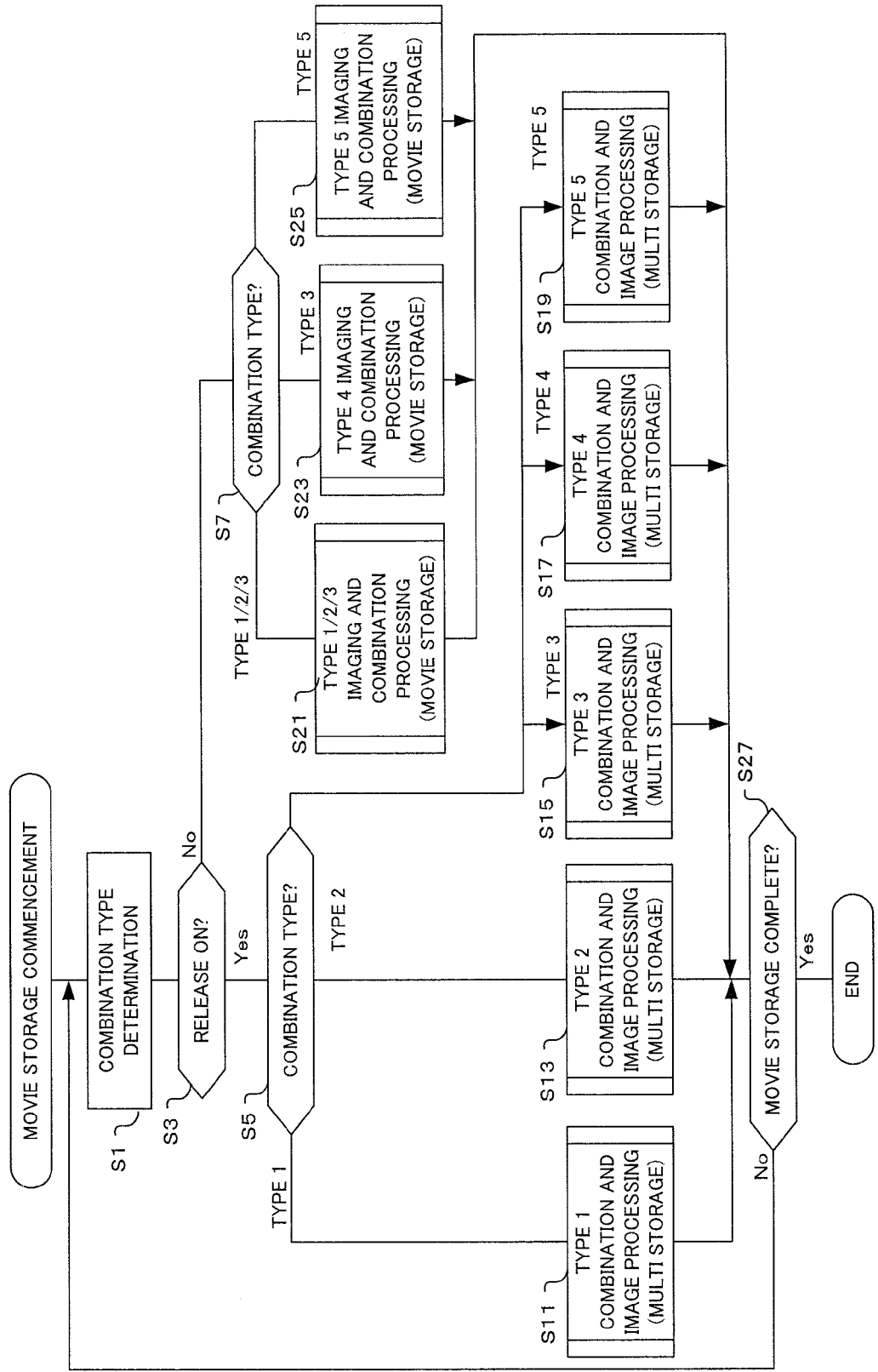
FIG. 13 is a flowchart showing operation of the camera of the first embodiment of the present invention at the time of shooting.

Next, operation one embodiment of the present invention will be described using the flowcharts shown in FIG. 13 to FIG. 19. These flowcharts are executed by the microcomputer 25 in accordance with programs stored in the non-volatile memory. The flowchart shown in FIG. 13 shows processing flow for movie recording commencement, and if a movie button within the operation section 21 is operated this flow of operations commenced.

If the processing flow for movie recording commencement is entered, first, combination type determination is carried out (S1). Here, it is determined, based on movement amount (corresponding to amount of hand-shake) that has been detected by the movement amount detection circuit 15, to which of the types 1-5 that were described in FIG. 8 the hand-shake belongs.

If the combination type has been determined, it is next determined whether or not the release is on (S3). In a case where the photographer wants to record still pictures while shooting a movie, the release button within the operation section 21 is operated. In this step, determination is carried out based on the operating state of the release button.

If the result of the determination in step S3 is that the release is on, determination of combination type is carried out (S5). Here, processing advances to steps S11-S19 in accordance with the result of determination of combination type in step S1.

If the result of the determination in step S5 is type 1, type 1 imaging and combination processing (multi-storage) is executed (S11). As was described using FIG. 8, type 1 is a case where residual blur amount is smaller than a still picture blur limit, and in this case, when acquiring still picture image data it is not especially necessary to carry out positional alignment. Details of this type 1 processing will be described later using FIG. 14.

If the result of determination in step S5 is type 2, type 2 imaging and combination processing (multi-storage) is executed (S13). As was described using FIG. 8, type 2 is a case where residual blur amount is larger than a still picture blur limit, but smaller than a movie blur limit. In this case, a single frame is divided into two equal periods, and a composite still picture is acquired by performing superimposing processing after two images have been positionally aligned. Also, a movie image is acquired by carrying out superimposing processing without positionally aligning the two images. This type 2 is simply making four divided images in the flowchart for type 3 (refer to FIG. 15) which will be described later into two divided images, and so a detailed flowchart is omitted.

If the result of the determination in step S5 is type 3, type 3 imaging and combination processing (multi-storage) is executed (S15). As was described using FIG. 8, type 2 is a case where residual blur amount is larger than a still picture blur limit, but smaller than a movie blur limit, and amount of hand-shake is larger than for type 2. In this case, as has been described using the timing chart shown in FIG. 9, exposure time for a single frame is divided into four equal periods, and a composite still picture is acquired by performing superimposing processing after four images have been positionally aligned. Also, a movie image is acquired by carrying out superimposing processing without positionally aligning the four images. Details of this type 3 processing will be described later using FIG. 15.

If the result of the determination in step S5 is type 4, type 4 imaging and combination processing (multi-storage) is executed (S17). As has been described using FIG. 8, type 4 is a case where a residual blur amount is larger than a still picture blur limit and a movie blur limit. In this case, as has been described using the timing chart shown in FIG. 10, the effects of hand-shake are reduced by carrying out positional alignment not only for still pictures but also for the movie. Similarly to type 3, with type 4 a single frame is divided into two equal periods, and a composite still picture is acquired by performing superimposing processing after four images have been positionally aligned. Also, with respect to the first two images and the second two images, composite images are generated by carrying out superimposing processing without performing respective positional alignment, and a movie image is acquired by performing superimposing processing after carrying out positional alignment of these generated composite images. Details of this type 4 processing will be described later using FIG. 16.

If the result of determination in step S5 is type 5, type 5 imaging and combination processing (multi-storage) is carried out (S19). As has been described using FIG. 8, type 5 is a case where a residual blur amount is larger than a still picture blur limit and a movie blur limit. In this case, as with type 4, positional alignment is carried out not only for still pictures but also for a movie, but as was described using the timing chart shown in FIG. 11, more intense blur correction processing is carried out than for type 4. Similarly to type 3 and type 4, with type 5 a single frame is divided into four equal periods, and a composite still picture is acquired by performing superimposing processing after four images have been positionally aligned. Also, a movie image is acquired by performing superimposing processing after four images have been positionally aligned. Details of this type 5 processing will be described later using FIG. 17.

If the result of determination in step S3 is that release is not on, then it is a case where still picture shooting is not taking place, and so movie shooting only continues. First, therefore, similarly to step S5, the combination type is determined (S7).

If the result of determination in step S7 is type 1, 2, or 3, type 1/2/3 imaging and combination processing (movie storage) is carried out (S21). In the case of shooting still pictures, processing is different depending on whether it is type 1, type 2, or type 3. However, in the case of movie shooting only, where still picture shooting is not carried out, since the residual blur amount is smaller than the movie blur limit in the case of type 1, 2 or 3, the processing is the same. In this step, if the exposure time for a single frame has elapsed image data is read out, and stored in the storage medium 35 after carrying out movie image processing. Details of this type 1/2/3 processing will be described later using FIG. 18.

If the result of determination in step S7 is type 4, type 4 imaging and combination processing (movie storage) is carried out (S23). Type 4 is a case where the residual blur amount is larger than the movie blur limit, and the effect of handshake is reduced by carrying out positional alignment. With type 4, the exposure time for a single frame is divided into four equal times, and for the first two images and the second two images, composite images are generated by carrying out superimposing processing without performing respective positional alignment, and a movie image is acquired by performing superimposing processing after carrying out positional alignment of these two generated composite images. This type 4 is simply making four divided images in the flowchart for type 5 (refer to FIG. 19) which will be described later, into two divided images, and so a detailed flowchart is omitted.

If the result of determination in step S7 is type 5, type 5 imaging and combination processing (movie-storage) is carried out (S25). Type 5 is a case where residual blur amount is larger than the movie blur limit, and also larger than the residual blur amount for type 4. In this case more intense blur correction processing than for type 4 is applied. Exposure time of a single frame is divided into four equal periods, and a composite movie image is acquired by performing superimposing processing after four images have been positionally aligned. Details of this type 5 processing will be described later using FIG. 19.

Once imaging and combination processing (multi-storage) has been carried out in steps S11-S19, or once imaging and combination processing (movie storage) has been carried out in steps S21-S25, determination is carried out as to whether or not movie storage is complete (S27). Here, determination as to whether or not the movie button within the operation section 21 has been pressed again is carried out based on the operating state of the movie button. If the result of this determination is that movie storage is not complete, processing returns to step S1, where the combination type is determined based on the detection result by the movement amount detection circuit 15, and the previously described processing is executed based on the result of this determination. On the other hand, if the result of determination in step S27 is that movie storage is complete, processing for movie storage is terminated.

Next, the type 1 imaging and combination processing (multi-storage) of step S11 will be described using FIG. 14. If this flow is entered, imaging is first carried out (S31). Here, the imaging section 11 performs photoelectric conversion of a subject image for a specified time. Once imaging is completed, readout is performed (S33). Here image data is read out from the imaging section 11.

Once readout of image signals has been carried out, an amount of movement between frames is detected (S35). Here, the movement amount detection circuit 15 calculates amount of movement between frames by comparing image data that was read out in the previous step S33 and image data that was read out in the current step S33.

Figure 14:
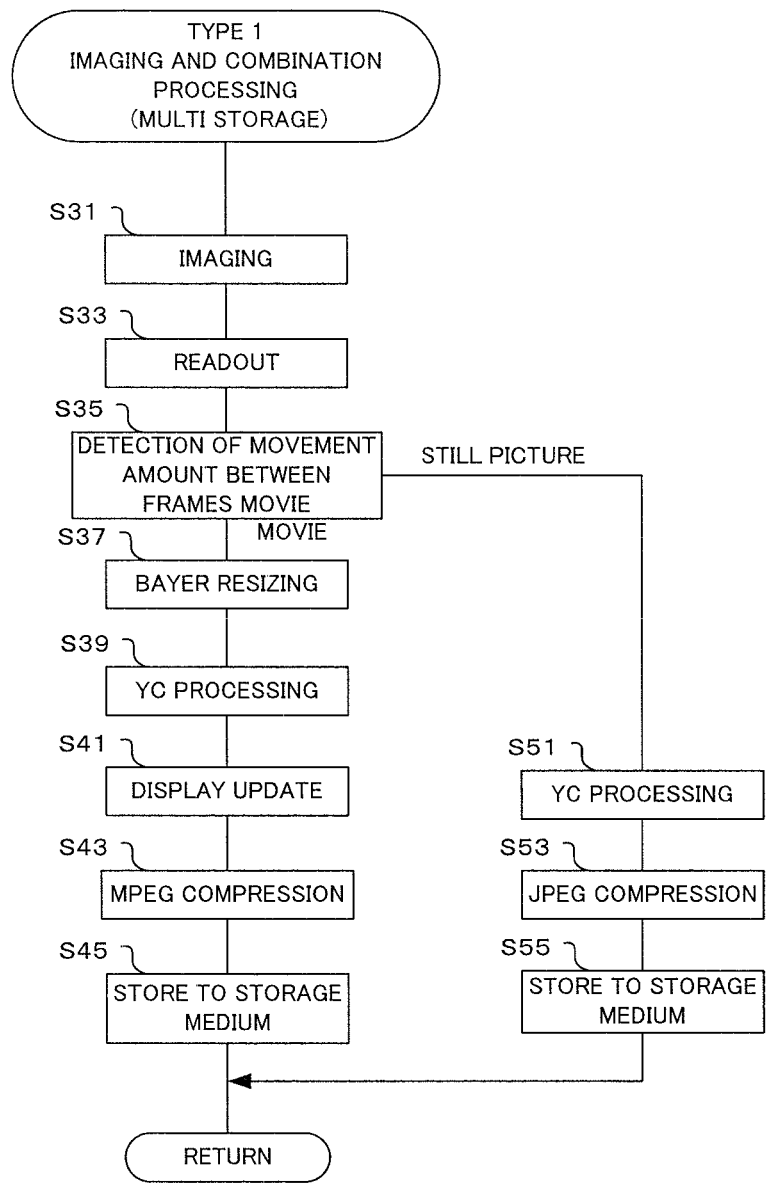
FIG. 14 is a flowchart showing operation for imaging and combination processing (type 1: multi-storage) of a camera of one embodiment of the present invention.

With the type 1 imaging and combination processing shown in FIG. 14, movie recording and still picture recording are carried out in parallel, with movie storage being carried out by executing steps S37-S45, and still picture storage being carried out by executing steps S51-S55 in parallel with the movie storage.

First, storage of a movie will be described. Re-sizing of Bayer data for detecting interframe movement amount is carried out (S37). Here, the RAW clipping section 19a within the image processing circuit 19 performs resizing of image data that was read out in step S33, and image data is reduced in size for movie processing.

Once resizing has been carried out, YC processing is carried out (S39). Here, the image processing circuit 19 carries out image processing such as noise reduction processing, white balance correction, demosaicing processing, color conversion processing, tone conversion processing, RGB to YC conversion processing, edge extraction processing, edge enhancement processing, and YC resizing processing etc. and generates YC data.

Once YC processing has been carried out, display update is next carried out (S41). Here, update of liveview display that is displayed on the rear surface liquid crystal monitor 29 and the EVF 31 is carried out using image data that was image processed using image data for a single frame that was read out in step S33. This updated live view display continues until the next readout and image processing is carried out and display update is performed.

MPEG compression is carried out together with the display update (S43). Here, the data compression section 19m within the image processing circuit 19 carries out MPEG compression using YC data that was subjected to YC processing in step S39. The resulting data is then stored in the storage medium (S45). Here, the image data that was MPEG compressed in step S43 is stored in the storage medium 35.

Next, storage of still pictures will be described. If the interframe movement amount detection has been carried out in step S35, YC processing is carried out (S51). Here, similarly to step S39, the image processing circuit 19 carries out image processing such as noise reduction processing, white balance correction, demosaicing processing, color conversion processing, tone conversion processing, RGB to YC conversion processing, edge extraction processing, edge enhancement processing, and YC resizing processing etc. and generates YC data.

Once YC processing has been carried out, JPEG compression is carried out (S53). Here, the data compression section 19m within the image processing circuit 19 carries out JPEG compression using YC data that was subjected to YC processing in step S51. The resulting data is then stored in the storage medium (S55). Here, the image data that was JPEG compressed in step S53 is stored in the storage medium 35.

Once display update is carried out in step S41 and the image data is stored in storage medium in steps S45, S55, the original processing flow is returned to.

Next, the type 3 imaging and combination processing (multi-storage) of step S15 will be described using FIG. 15. This flowchart is for execution of the timing chart that was shown in FIG. 9 relating to the previously described type 3.

Figure 15:
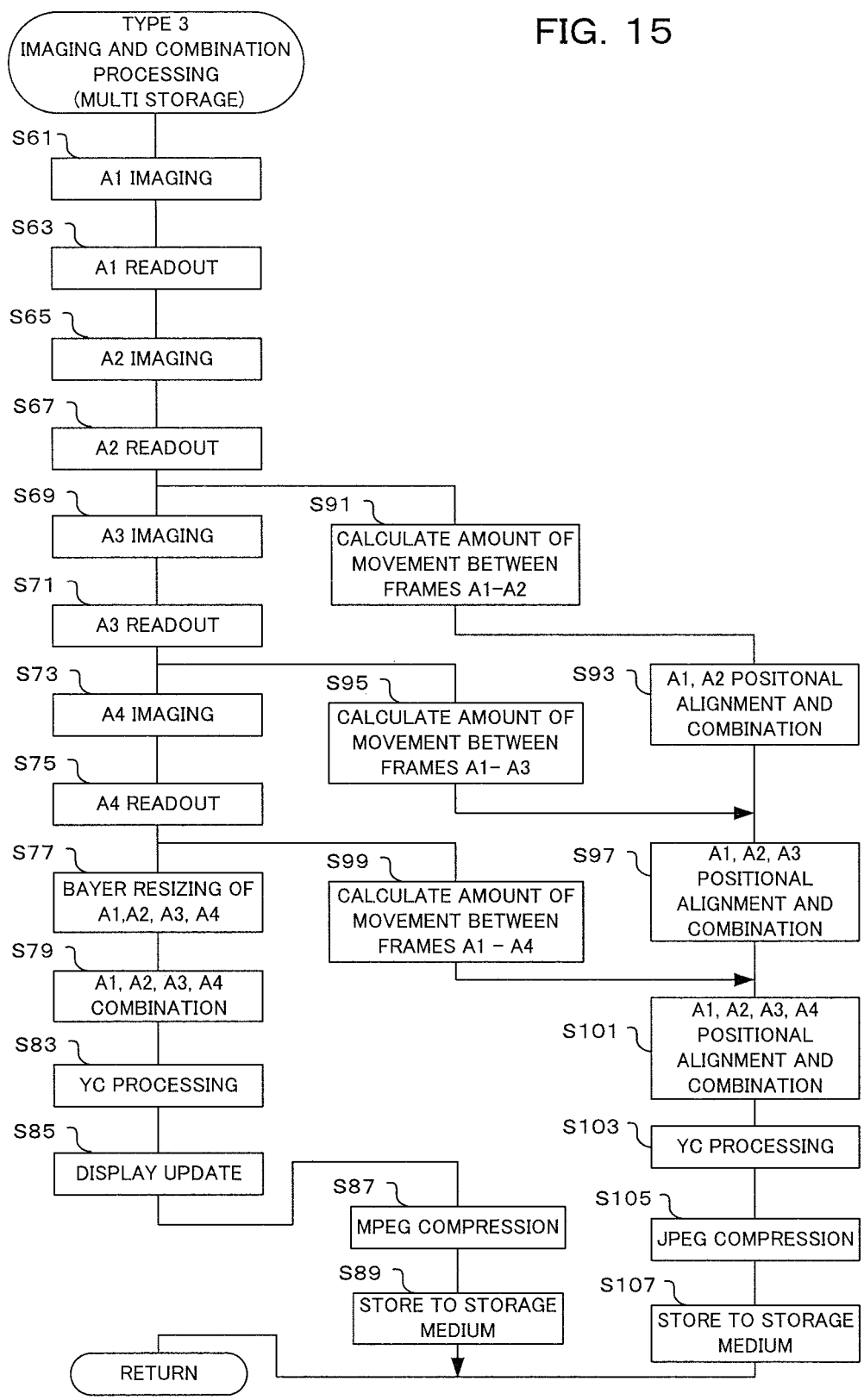
FIG. 15 is a flowchart showing operation for imaging and combination processing (type 3: multi-storage) of a camera of one embodiment of the present invention.

If the flow shown in FIG. 15 is entered, imaging of A1 is first carried out (S61). This imaging is carried out by the imaging section 11, and corresponds to the imaging of time T3-T3a in the timing chart shown in FIG. 9. Next, read out of A1 is carried out (S63). This readout is reading out of image data for imaging of A1 in step S61, and corresponds to the readout at time 61 in the timing chart shown in FIG. 9.

Next, imaging of A2 is carried out (S65). This imaging corresponds to the imaging of time T3a-T3b in the timing chart shown in FIG. 9. Next, read out of A2 is carried out (S67). This readout corresponds to the readout at time 62 (refer to FIG. 9).

Once A2 readout has been carried out an amount of movement between frames A1-A2 is calculated (S91). Here the movement amount detection circuit 15 compares the image of A1 that was read out in step S63 and the image of A2 that was read out in step S67, and calculates amount of movement between frames. This movement amount calculation corresponds to the movement amount calculation at time 65 (refer to FIG. 9).

Once the movement amount calculation between frames A1 and A2 has been carried out, positional alignment of A1 and A2 is carried out (S93). Here, the combining processing circuit 17 carries out positional alignment for the image of A1 that was read out in step S63 and the image of A2 that was read out in step S67, based on the amount of movement that was calculated in step S91, and then carries out superimposing processing for still pictures. This positional alignment and combination corresponds to the combination processing (still pictures) at time 68 (refer to FIG. 9).

Once read out of the A2 image has been carried out in step S67, A3 imaging is carried out in parallel with the movement amount calculation in S91 that was described previously (S69). This imaging corresponds to the imaging of time T3b-T3c in the timing chart shown in FIG. 9. Next, read out of A3 is carried out (S71). This readout corresponds to the readout at time 63 (refer to FIG. 9).

Once A3 readout has been carried out, an amount of movement between frames A1-A3 is calculated (S95). Here the movement amount detection circuit 15 compares the image of A3 that was read out in step S71 and the image of A1 that was read out in step S63, and calculates amount of movement between frames. This movement amount calculation corresponds to the movement amount calculation at time 66 (refer to FIG. 9).

Once the movement amount calculation between frames A1-A3 has been carried out, positional alignment of A1, A2 and A3 is carried out (S97). Here, the combining processing circuit 17 carries out positional alignment for the image of A3 that was read out in step S71 and the image resulting from the positional alignment of A1 and A2 that were combined in step S93, based on the amount of movement that was calculated in step S95, and then carries out superimposing processing for still pictures. This positional alignment and combination corresponds to the combination processing (still pictures) at time 69 (refer to FIG. 9).

Once read out of the A3 image has been carried out in step S71, A4 imaging is carried out in parallel with the movement amount calculation in S95 that was described previously (S73). This imaging corresponds to the imaging of time T3c-T4 in the timing chart shown in FIG. 9. Next, read out of A4 is carried out (S75). This readout corresponds to the readout at time 64 (refer to FIG. 9).

Once A4 readout has been carried out, an amount of movement between frames A1-A4 is calculated (S99). Here the movement amount detection circuit 15 compares the image of A4 that was read out in step S75 and the image of A1 that was read out in step S63, and calculates amount of movement between frames. This movement amount calculation corresponds to the movement amount calculation at time 67 (refer to FIG. 9).

Once the movement amount calculation between frames A1-A4 has been carried out, positional alignment of A1, A2, A3 and A4 is carried out (S101). Here, the combining processing circuit 17 carries out positional alignment for the image of A4 that was read out in step S75 and the image resulting from positional alignment of A1, A2, A3 that were combined in step S97, based on the movement amount that was calculated in step S99, and then carries out superimposing processing for still pictures. This positional alignment and combination corresponds to the combination processing (still pictures) at time 70 (refer to FIG. 9).

Once positional alignment and combination of A1, A2, A3 and A4 has been carried out in step S101, next, similarly to step S51 (FIG. 14), YC processing for still picture generation is carried out (S103), similarly to step S53 JPEG compression is carried out (S105), and similarly to step S55 the resulting data is stored in the storage medium (S107).

Once A4 image readout has been carried out in step S75, Bayer resizing of A1, A2, A3 and A4 is carried out in parallel with the movement amount calculation of S99 that was described previously (S77). Every time image data readout is carried out in steps S63, S67, S71, and S75, superimposing processing for images takes place without carrying out positional alignment (refer to times 71-72 in FIG. 9). The RAW clipping section 19a within the image processing circuit 19 carries out Bayer resizing for each of the images A1, A2, A3 and A4. Once Bayer resizing has been carried out, combining processing circuit 17 carries out combination processing for A1, A2, A3 and A4 (S79).

Once combination processing has been carried out for A1, A2, A3, A4, next, similarly to step S39 (refer to FIG. 14), YC processing is carried out (S83). Here, an image that has been subjected to combination processing without positional alignment for a movie is subjected to YC processing by the image processing circuit 19.

Once YC processing of a movie image has been carried out, display update is next carried out (S85). Also, MPEG processing is carried out for image data that was subjected to YC processing in step S83 (S87), and the resulting data is stored in the storage medium (S89). The processing in these steps S85-S89 is similar to the processing in steps S41-S45 in FIG. 14, and so detailed description is omitted. Once storage to the storage medium has been carried out in step S89 or S107, the original processing flow is returned to.

Figure 16:
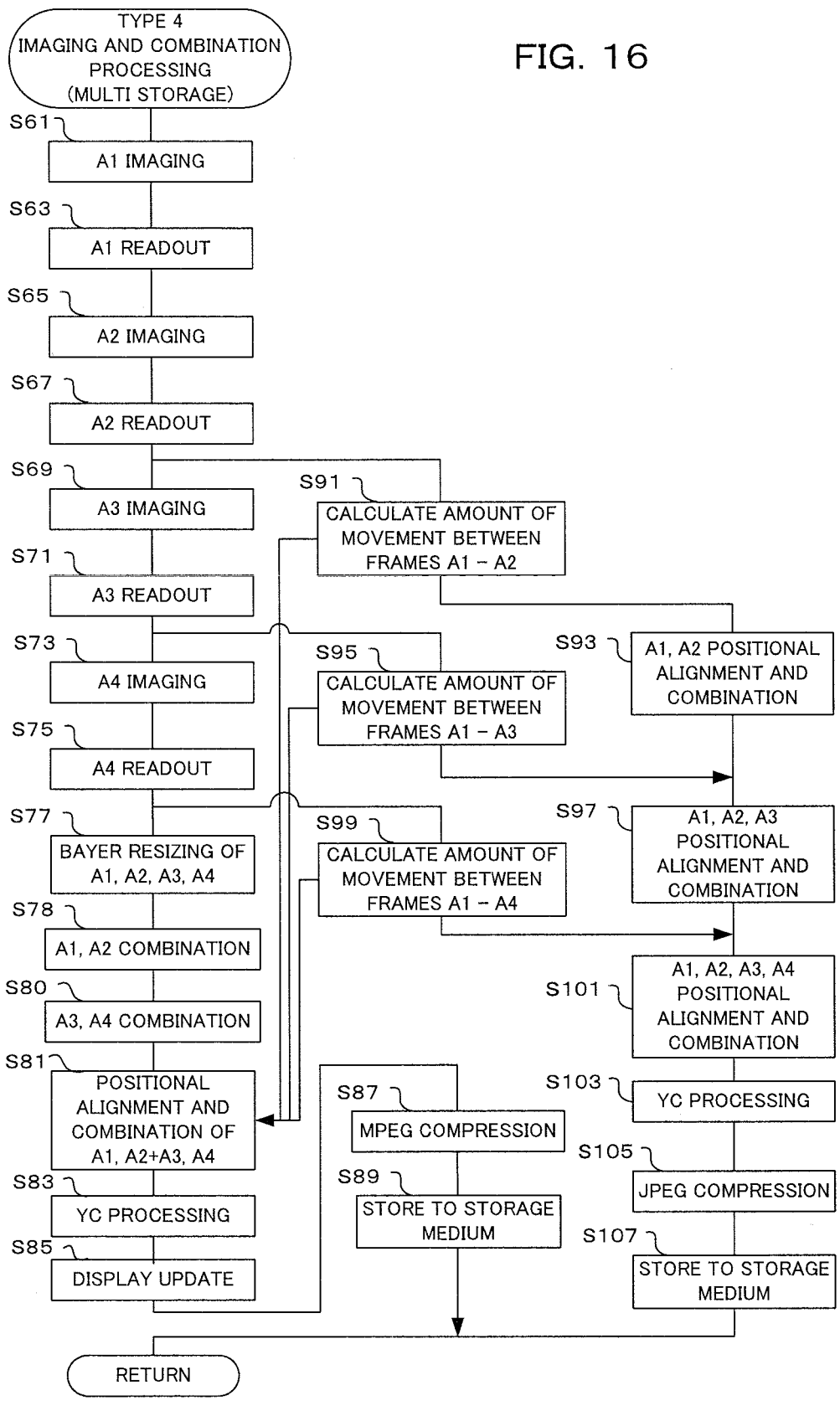
FIG. 16 is a flowchart showing operation for imaging and combination processing (type 4: multi-storage) of a camera of one embodiment of the present invention.

Next, the type 4 imaging and combination processing (multi-storage) of step S17 will be described using the flowchart shown in FIG. 16. This flowchart is for execution of the timing chart that was shown in FIG. 10 relating to the previously described type 4. As was described previously, this type 4 control is combination for a movie with 2+2 frame positional alignment, and combination for a still picture with 4-frame positional alignment. Compared to type 3, the still picture processing is the same but the movie processing differs only in that 2+2 frame positional alignment is carried out. Therefore, the only difference is that step S79 in the flowchart shown in FIG. 15 is replaced with steps S78, S80 and S81. Description will center on these points of difference, and steps carrying out the same processing have the same step numbers attached, and detailed description is omitted.

Once A4 image readout has been carried out in step S75, and Bayer resizing of A1, A2, A3 and A4 has been carried out in step S77, combination of A1 and A2 is next carried out (S78). Here, the combining processing circuit 17 carries out combination of A1 and A2 that were read out in steps S63 and S67 by superimposing processing without carrying out positional alignment. This corresponds to the processing at time 81 in FIG. 10. In the processing flow of FIG. 16 this combination is carried out after reading all of the images A1-A4, but it is also perfectly acceptable to carry out combination immediately after readout of images A1 and A2, as in the timing chart of FIG. 10.

Next, a combination of A3 and A4 is carried out (S80). Here, the combining processing circuit 17 carries out combination of A3 and A4 that were read out in steps S71 and S75 by superimposing processing without carrying out positional alignment. This corresponds to the processing at time 82 in FIG. 10.

Once combination of A3 and A4 has been carried out, positional alignment of A1, A2+A3 and A4 is carried out (S81). Here, using the movement amounts that were calculated in steps S91, S95, and S99, positional alignment is carried out for the A1, A2 composite image that was combined in step S78 and the A3, A4 composite image that was combined in step S80, and then a composite image for a movie is generated by superimposing processing.

Once the positional alignment and combination for A1, A2+A3, A4 has been carried out in step S81, movie image processing and storage is carried out in step S83 and after, and then the originating processing flow is returned to.

Next, the type 5 imaging and combination processing (multi-storage) of step S19 will be described using the flowchart shown in FIG. 17. This flowchart is for execution of the timing chart that was shown in FIG. 11 relating to the previously described type 5. As was described previously, with type 5 combination is carried out for both a movie and a still picture with 4-frame positional alignment. Compared to type 3, the still picture processing is the same but the movie processing differs only in that 4-frame positional alignment is carried out. Therefore, the only difference is that step S79 in the flowchart shown in FIG. 15 is replaced with step S82. Description will center on this point of difference, and steps carrying out the same processing have the same step numbers attached, and detailed description is omitted.

Once A4 readout has been carried out in step S75, and Bayer resizing of A1, A2, A3 and A4 has been carried out in step S77, combination of A1, A2, A3 and A4 is next carried out (S82). Here, using the movement amounts that were calculated in steps S91, S95, and S99, positional alignment is carried out for each of the images A1-A4 that were read out in steps S63, S67, S71 and S75, and then a composite image for a movie is generated by superimposing processing.

Once the positional alignment and combination for A1, A2, A3, and A4 has been carried out in step S82, movie image processing and storage is carried out in step S83 and after, and then the originating processing flow is returned to.

In the timing chart shown in FIG. 11, if each of the images A2-A4 are read-out (times 86-88), movement amounts are rapidly calculated (times 89-91), and combination processing for a movie is carried out (times 92-94). In the flowchart shown in FIG. 17 also, similarly to the image for a movie and the image for still picture, it is perfectly acceptable for a movement amount to be calculated every time an image is read out, and to carry out positional alignment and combining.

Figure 17:
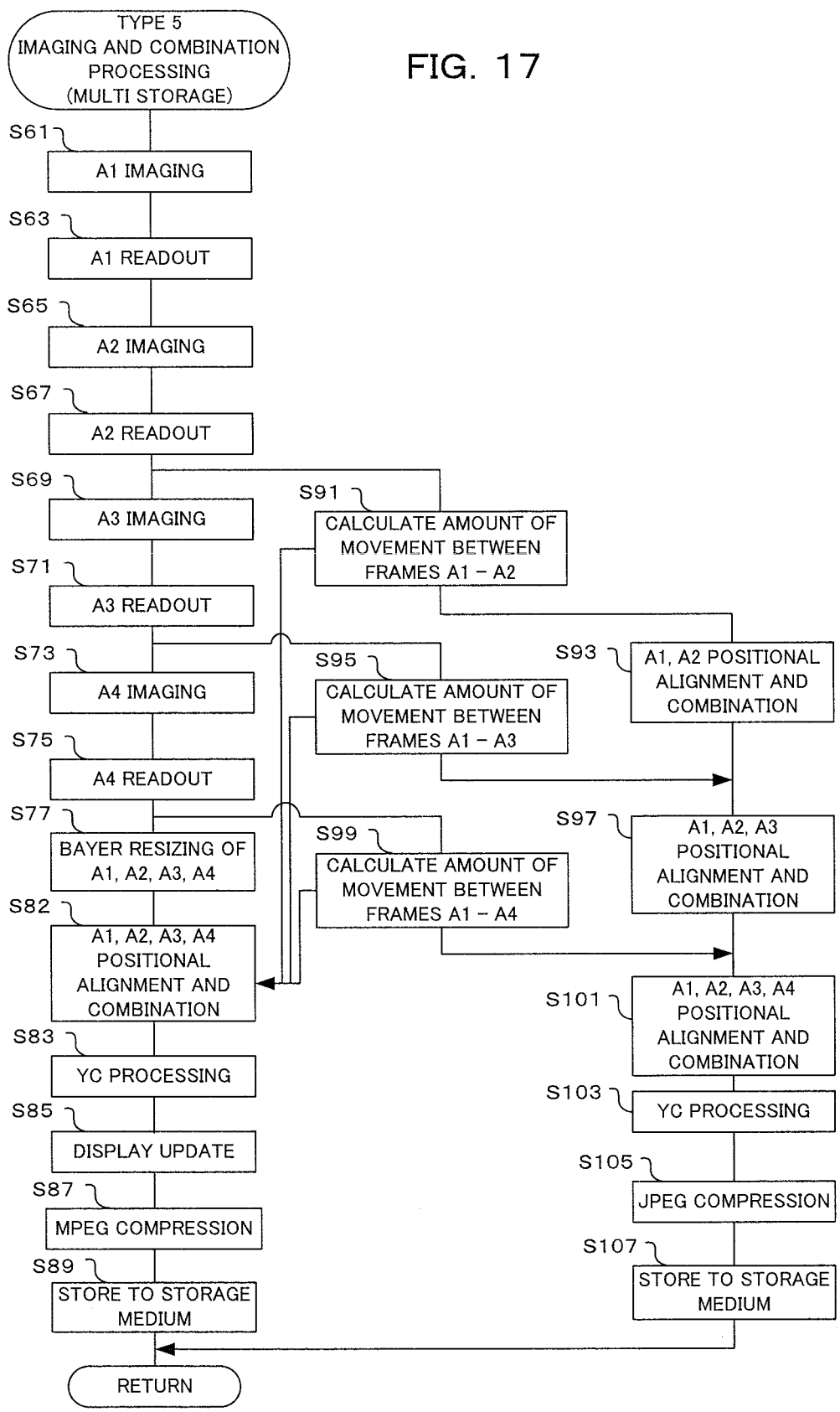
FIG. 17 is a flowchart showing operation for imaging and combination processing (type 5: multi-storage) of a camera of one embodiment of the present invention.
Figure 18:
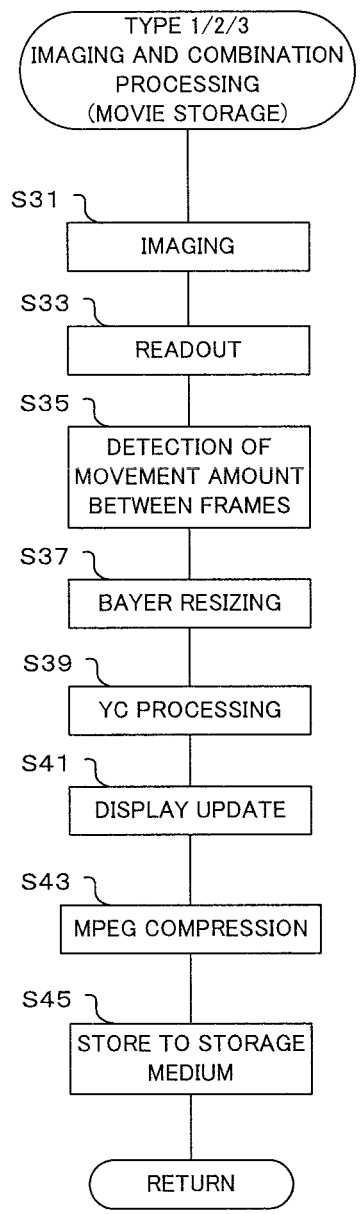
FIG. 18 is a flowchart showing operation for imaging and combination processing (types 1/2/3: movie-storage) of a camera of one embodiment of the present invention.

Next, the type 1/2/3 imaging and combination processing (movie storage) of step S21 is shown in FIG. 18. The processing flows for imaging and combination processing in previous described FIG. 14-FIG. 17 are all multi-storage in which still picture storage is carried out at the same time as movie storage, but in the processing flow for imaging and combination processing shown in FIG. 18 only movie storage is carried out without performing still picture storage. Therefore, the processing flow shown in FIG. 18 differs from the processing flow of FIG. 14 relating to type 1 in that steps S51-S55 for processing still pictures are omitted, and there are no newly added steps. In FIG. 18, for steps that execute the same processing as in FIG. 14, the same step numbers will be affixed and detailed description will be omitted.

Figure 19:
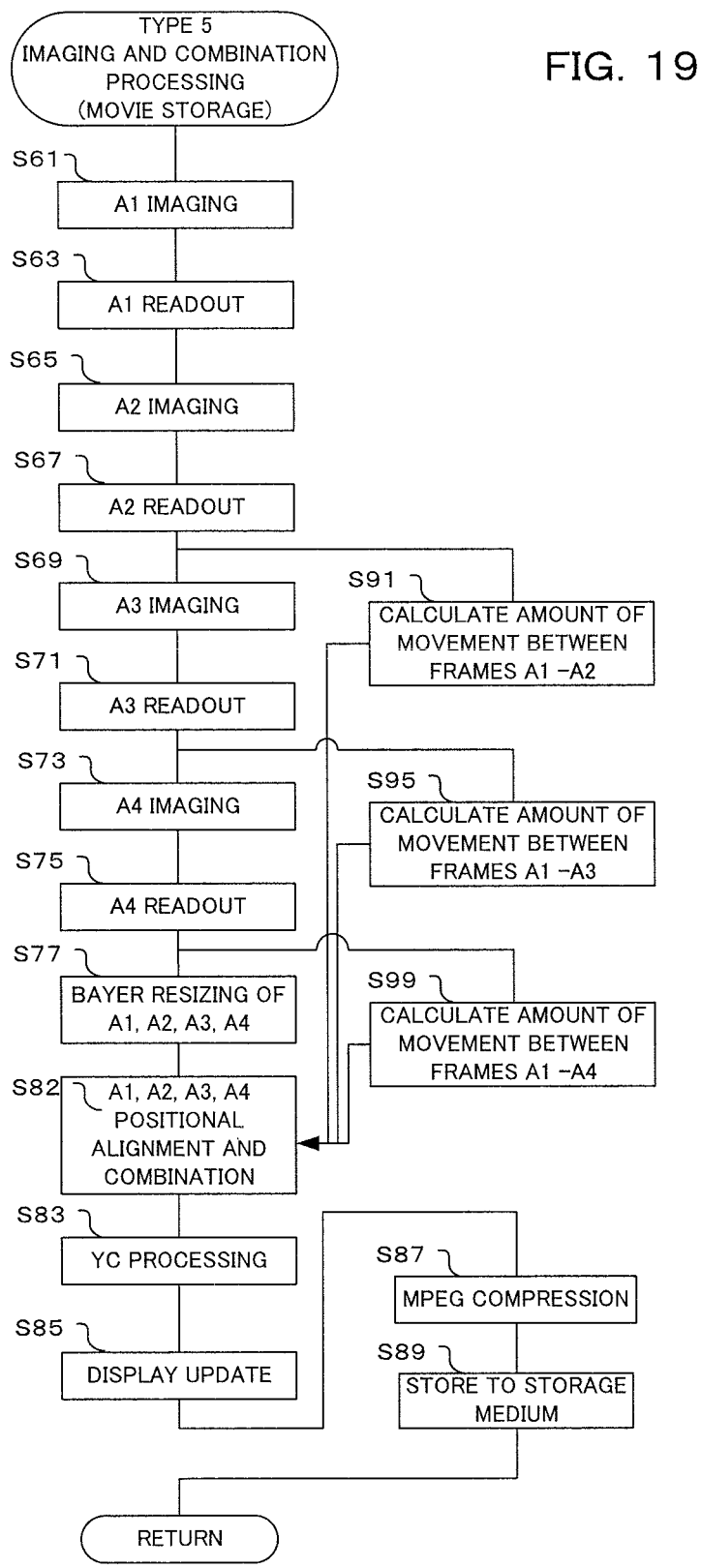
FIG. 19 is a flowchart showing operation for imaging and combination processing (type 5: movie-storage) of a camera of one embodiment of the present invention.

Next, the type 5 imaging and combination processing (movie storage) of step S25 is shown in FIG. 19. In the processing flow for imaging and combination processing shown in FIG. 19, as with the processing flow for imaging and combination processing shown in FIG. 18, only movie storage is carried out and still picture storage is not carried out.

Therefore, the processing flow shown in FIG. 19 differs from the processing flow of FIG. 17 relating to type 5 in that steps S93, S97 and steps S101-S107 for processing still pictures are omitted, and there are no newly added steps. In FIG. 19, for steps that execute the same processing as in FIG. 17, the same step numbers will be affixed and detailed description will be omitted.

As has been described above, with one embodiment of the present invention, exposure is carried out by dividing a time corresponding to a single frame of a movie image into a plurality of time periods (for example, the exposure by dividing t4-t5 in FIG. 5 into 4 periods, or the exposure by dividing T3-T4 in FIG. 9 into 4 periods), a composite image is generated by carrying out positional alignment of images that have been acquired in the plurality of divided time periods (for example, the positional alignment in combination of A1-A4 in FIG. 5, the times 68-70 in FIG. 9), and this composite image is stored as still picture image data (for example time 75 in FIG. 9), or a composite image is generated without carrying out positional alignment of the images that have been acquired in the plurality of divided time periods (for example combination without the position alignment of A1-A4 in FIG. 5, times 71-73 in FIG. 9), and this composite image is stored as movie data (for example, time 79 in FIG. 9). It is therefore possible to improve the smoothness of a stored movie image as well as to reduce still picture blurring. Specifically, since for a still picture a composite image is generated by carrying out positional alignment of a plurality of divided images, it is effectively the same as shooting with a high shutter speed, and it is possible to reduce the effects of hand-shake. Also, since for a movie a composite image is generated without carrying out positional alignment of the plurality of divided images, since it is effectively shooting with the same shutter speed as for the previous and next frame, there is almost no difference in quality from that of shooting a still picture.

Also, in the one embodiment of the present invention, exposure time for a single frame is divided in accordance with an amount of hand-shake. It is therefore possible to have an optimum number of divisions according to hand-shake. Also, in the one embodiment of the present invention, when detecting amount of hand-shake, detection is carried out based on amount of movement of the subject image between movie image data. There is therefore no need to provide a sensor for detecting hand-shake, such as a Gyro or 6-axis sensor. Also, in the one embodiment of the present invention, amount of hand-shake is detected, and the number of divisions for exposure, as well as a combination method at the time of combination for a movie, are determined in accordance with the amount of hand-shake. It is therefore possible to carry out the optimal combination method in accordance with the amount of hand-shake.

Also in the one embodiment of the present invention, as shown for type 4, a plurality of composite images are also generated for a movie image without carrying out positional alignment, and then positional alignment of the plurality of composite images is carried out. As a result, even in cases where hand-shake is large and even a movie becomes unsightly, it is possible to achieve both smoothness and reduced blur for a movie, by adopting this combination method.

Also, in a modified example of one embodiment of the present invention, as was described using FIG. 7, a single frame of a movie has exposure time divided into a shorter time and a longer time, and such divided exposure is repeatedly executed over a plurality of frames, with a plurality of long time images being stored as respective movies, and a plurality of short time images being added while being positionally aligned, and then made into still pictures. It is therefore possible to improve the smoothness of a stored movie image as well as to reduce still picture blurring, even when hand-shake is large.

With the one embodiment of the present invention, determination of type 1-type 5 has been carried out based on amount of movement between movie frames that has been detected by the movement amount detection circuit 15. However combination type determination can also be carried out based not on amount of movement between movie frames, but by determining that blurring is large when subject brightness is low. It is also possible to reduce the number of frames to be divided in the case where shooting sensitivity is high, in consideration of noise amplification due to divided shooting and combination.

Also, in the one embodiment of the present invention, exposure time for a single frame is divided into four, but the number of divisions can be larger than 4, or it can be 3. In the event that the number of divisions is changed, it is also possible to change the number of types in accordance with the number of divisions. Also, the second modified example of processing in the case where the release button is operated while shooting a movie and still picture shooting is carried out, that was shown in FIG. 7 and FIG. 12, was not incorporated into the flowcharts shown in FIG. 13-FIG. 19, but it is perfectly possible to incorporate this type.

Further, with the embodiment and modified examples of the present invention, a device for taking pictures has been described using a digital camera, but as a camera it is also possible to use a digital single lens reflex camera or a compact digital camera, or a camera for mainly movie use such as a video camera, and further to have a camera that is incorporated into a mobile phone, a mobile information terminal (PDA: Personal Digital Assistant), game console etc. In any event, it is possible to adopt the present invention as long as a device is capable of shooting still pictures while shooting movies.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device for taking and storing movies and still pictures, comprising:
   an image sensor for photoelectrically converting an incident optical image;
   an image processing section for processing output signals of the image sensor to acquire image data;
   a control section for controlling exposure of the image sensor and controlling taking of the optical image, wherein the control section, when taking still pictures while shooting a movie, carries out exposure by dividing a time corresponding to a single frame of a movie image into a plurality of times, applies processing by the image processing section to acquire a plurality of image data, performs positional alignment of subject images of the plurality of image data and combines a plurality of image data, and stores as still picture data, and combines a plurality of image data without carrying out positional alignment of subject images of the plurality of image data and stores as a single frame of movie image data; and a shake amount detection section for detecting amount of shake, and wherein the control section, when combining movie image data using a plurality of image data, in the case where amount of shake is larger than a first specified amount, combines a plurality of image data that were obtained consecutively from among the plurality of image data without carrying out positional alignment of a subject image to generate a plurality of composite image data, carries out positional alignment for a subject image of the plurality of composite image data, and stores as a single frame of move image data.

2. The imaging device of claim 1, wherein the control section sets a number of the divisions based on an amount of shake detected by the shake amount detection section.

3. The imaging device of claim 1, wherein: the control section, when combining movie image data using a plurality of image data, in the case were amount of shake is larger than a second specified amount that is larger than the first specified amount, combines all of a plurality of image data by carrying out positional alignment of a subject image, and stores as a single frame of movie image data.

4. The imaging device of claim 1, wherein: the shake amount detection section detects amount of shake based on amount of movement of the subject image between the image data.

5. The imaging device of claim 1, wherein: the control section carries out positional alignment for a subject image of a plurality of composite images based on amount of a subject image movement between a plurality of image data.

6. The imaging device of claim 5, wherein: the control section aligns a position of a subject image of image data that was initially acquired, among the plurality of image data, with a position of a subject image of another image data, among the plurality of image data.

7. An imaging device for shooting and storing movies and still pictures, comprising:
an image sensor for photoelectrically converting an incident optical image;
an image processing section for processing output signals of the image sensor to acquire image data; and
a control section for controlling exposure of the image sensor and controlling taking of the optical image, wherein
the control section, when taking still pictures while shooting a movie, carries out exposure by dividing a time corresponding to a single frame of a movie, with respect to a plurality of frames of a movie, into a longer time and a shorter time, applies processing by the image processing section to acquire a plurality of image data, performs positional alignment of a subject image to combine image data corresponding to the shorter time exposure, with respect to the plurality of frames, and stores as still picture data, and stores image data corresponding to the longer time exposure, with respect to the plurality of frames, as respective single frames of the plurality of frames of the movie image, wherein the control section, with respect to the plurality of frames, multiplies image data corresponding to the longer exposure time by a gain for compensating for a shortfall in exposure time when exposure has been carried out by dividing the time corresponding to a single frame of a movie into a longer time and a shorter time, and stores as respective single frames of a plurality of frames of the movie image.

8. The imaging device of claim 7, wherein: the control section, with respect to the plurality of frames, after carrying out exposure corresponding to a shorter divided time within a single frame, carries out exposure corresponding to a longer divided time.

9. The imaging device of claim 7, further comprising: a shake amount detection section for detecting amount of shake, and wherein
the control section sets a ratio for division of the long time and the short time based on an amount of shake detected by the shake amount detection section.

10. The imaging device of claim 9, wherein: the shake amount detection section amount of shake based on amount of movement of the subject image between the image data.

11. An imaging method, for processing output signals of an image sensor for photoelectrically converting an incident optical image to acquire image data, and shooting and storing movies and still pictures, comprising:
when shooting still pictures during movie shooting, carrying out exposure by dividing a time corresponding to a single frame of a movie into a plurality of time periods and acquiring a plurality of image data by carrying out image processing;
carrying out positional alignment of a subject image of the plurality of image data to combine a plurality of image data, and storing as still picture data, and combining a plurality of image data without carrying out positional alignment of the subject image of the plurality of image data and storing as a single frame of movie data;
detecting shake amount; and
when combining movie image data using the plurality of image data, in a case where the shake amount is larger than a first specified amount, combining a plurality of image data that were obtained consecutively from among the plurality of image data without carrying out positional alignment of a subject image to generate a plurality of composite image data, carrying out positional alignment for a subject image of the plurality of composite image data, and storing as a single frame of movie image data.

12. The imaging method of claim 11, further comprising: setting a number of the divisions based on detected amount of shake.

13. The imaging method of claim 11, wherein: when combining movie data using a plurality of image data, in a case where the shake amount is larger than a second specified amount that is larger than the first specified amount, combining all of a plurality of image data by carrying out positional alignment of a subject image, and storing as a single frame of movie data.

14. The imaging method of claim 11, wherein: the shake amount is detected based on amount of movement of a subject image between the image data.

15. The imaging method of claim 11, wherein: positional alignment for a subject image of a plurality of image data is carried out based on amount of movement of the subject between a plurality of image data.

* * * * *